United States Patent
Agata et al.

(10) Patent No.: US 6,947,278 B2
(45) Date of Patent: Sep. 20, 2005

(54) INFORMATION PROCESSING APPARATUS

(75) Inventors: Kenichi Agata, Tokyo (JP); Takashi Yamamoto, Kanagawa (JP); Yuichiro Hisakawa, Nagano (JP)

(73) Assignee: Sony Corporation, Tokyo (JP)

( * ) Notice: Subject to any disclaimer, the term of this patent is extended or adjusted under 35 U.S.C. 154(b) by 112 days.

(21) Appl. No.: 10/439,933

(22) Filed: May 16, 2003

(65) Prior Publication Data

US 2003/0202320 A1 Oct. 30, 2003

Related U.S. Application Data

(62) Division of application No. 09/946,578, filed on Sep. 5, 2001, now Pat. No. 6,680,845.

(30) Foreign Application Priority Data

| Sep. 6, 2000 | (JP) | ................................. 2000-270452 |
| Sep. 6, 2000 | (JP) | ................................. 2000-270453 |
| Oct. 13, 2000 | (JP) | ................................. 2000-313759 |
| Oct. 13, 2000 | (JP) | ................................. 2000-313760 |

(51) Int. Cl.⁷ .................................................. G06F 1/16
(52) U.S. Cl. ........................ 361/683; 345/156; 348/220
(58) Field of Search ................................. 361/680–686, 361/724–727; 312/223.1, 223.7; 348/220; 345/156–157; 364/708.1; 341/22

(56) References Cited

U.S. PATENT DOCUMENTS

| 5,808,672 A | 9/1998 | Wakabayashi et al. ...... 348/220 |
| 5,898,600 A | 4/1999 | Isashi .......................... 348/14 |
| 6,069,648 A | 5/2000 | Suso et al. .................... 348/14 |
| 6,275,376 B1 * | 8/2001 | Moon ......................... 361/683 |
| 2002/0156660 A1 * | 10/2002 | Nishimura et al. ............ 705/5 |
| 2003/0115384 A1 * | 6/2003 | Sonehara et al. ............. 710/10 |

FOREIGN PATENT DOCUMENTS

| EP | 0757479 A2 | 2/1997 | |
| JP | 05-242040 | 9/1993 | ........... G06F/15/02 |
| JP | 2000 92364 | 3/2000 | |

OTHER PUBLICATIONS

U.S. Appl. No. 09/944,080, filed Sep. 4, 2001, Fukuda et al.

* cited by examiner

Primary Examiner—Hung Van Duong
(74) Attorney, Agent, or Firm—Frommer Lawrence & Haug LLP; William S. Frommer; Darren M. Simon

(57) ABSTRACT

The invention provides an information processing apparatus wherein a camera section has an improved performance and malfunction involved in use of the camera section can be prevented. The information processing apparatus includes a computer body having a keyboard on which a plurality of operation keys are provided. A display section having a display screen thereon is supported on the computer body for pivotal motion around a fixed axis between a covering position in which the display section covers the computer body and an uncovering position in which the display section does not cover the computer body and for pivotal motion around a second axis extending perpendicularly to the first axis. Further, a camera section is supported for pivotal motion on the computer body.

1 Claim, 29 Drawing Sheets

INFORMATION PROCESSING APPARATUS

This application is a divisional of U.S. application Ser. No. 09/946,578, filed Sep. 5, 2001 now U.S. Pat. No. 6,680,845.

BACKGROUND OF THE INVENTION

This invention relates to an information processing apparatus, and more particularly to an information processing apparatus of the type which includes a computer body having a keyboard thereon and a display section having a display screen thereon.

An information processing apparatus is conventionally available wherein a display section is supported for opening and closing movement on a computer body having a keyboard on which a plurality of operation keys are disposed.

An exemplary one of conventional information processing apparatus of the type mentioned is shown in FIG. 30.

Referring to FIG. 30, the information processing apparatus 200 shown includes a computer body 202 having a keyboard 201 which has a plurality of operation keys arranged on an upper face thereof, and a display section 203 supported for pivotal motion at a rear end portion of the computer body 202. The display section 203 has a display screen 204 and a peripheral portion serving as a frame portion 205 which holds the display screen 204. The display section 203 can be pivoted with respect to the keyboard 201 to open or close, that is, cover or uncover, the keyboard 201.

A camera section 206 is provided on the frame portion 205 of the display section 203. In particular, the frame portion 205 is partly cut away, and the camera section 206 having a horizontally elongated shape is inserted in the cutaway portion of the frame portion 205. The camera section 206 is supported for pivotal or turning motion in the opposite directions as indicated by a double-sided arrow mark R on the frame portion 205.

The user can use the information processing apparatus 200 as a computer and perform inputting of information and so forth by operation of the operation keys. The user can use the information processing apparatus 200 also as a video camera. In particular, the user can use the camera section 206 to pick up a still picture or a moving picture and take in and record the picked up image into a recording medium or the like built in the computer body 202.

In the conventional information processing apparatus 200 described above, however, since the camera section 206 is provided at a portion of the frame portion 205 of the display section 203, the user can observe the display screen 204 and use the camera section 206 to pick up an image only while the keyboard 201 remains uncovered. Accordingly, the user is likely to operate a wrong one of the operation keys of the keyboard 201 in the uncovered state, resulting in malfunction of the information processing apparatus 200.

Further, since the camera section 206 is provided in a limited disposition space of part of the frame portion 205, the information processing apparatus 200 has a drawback in that a camera section of a large size and high picture quality cannot be incorporated in the information processing apparatus 200 and the camera section 206 is limited also in function as well.

SUMMARY OF THE INVENTION

It is an object of the present invention to provide an information processing apparatus wherein a camera section has an improved performance and malfunction involved in use of the camera section can be prevented.

In order to attain the object described above, according to an aspect of the present invention, there is provided an information processing apparatus, comprising a computer body having a keyboard on which a plurality of operation keys are provided, a display section having a display screen thereon and supported on the computer body for pivotal motion around a fixed axis between a covering position in which the display section covers the computer body and an uncovering position in which the display section does not cover the computer body and for pivotal motion around a second axis extending perpendicularly to the first axis, and a camera section supported for pivotal motion on the computer body.

With the information processing apparatus, the camera section can be used to pick up an image while the keyboard is covered with the display section. Consequently, the image pickup person is prevented from operating the operation keys of the keyboard in error, thereby preventing malfunction of the information processing apparatus caused by such error in operation.

Further, since the camera section is provided on the computer body, a camera section having a large size, high picture quality and high performances can be incorporated as the camera section.

The display section may have a frame portion on which the display screen is held, and a zoom button for changing the angle of view upon image pickup by the camera section may be provided on the frame portion. With the information processing apparatus, the user can operate the zoom button while grasping the information processing apparatus with both hands thereof. Consequently, the information processing apparatus can be used in augmented convenience of use when it is used as a video camera. Further, when the zoom button is used, since the information processing apparatus is grasped with both hands of the user, such a trouble that the information processing apparatus drops inadvertently can be prevented.

Or, the display section may have a frame portion on which the display screen is held, and an image pickup button for allowing image pickup to be performed by the camera section may be provided on the frame portion with the information processing apparatus, the user can operate the image pickup button while grasping the information processing apparatus with both hands thereof. Consequently, the information processing apparatus can be used in augmented convenience of use when it is used as a video camera.

Preferably, the information processing apparatus further comprises a lens protection cap removably mounted on a lens barrel, on which a front lens of the camera section is held, for protecting the front lens, and a holding recess for holding the lens protection cap upon image pickup by the camera section is formed on a face of the computer body opposite to a face on which the keyboard is disposed. With the information processing apparatus, the lens protecting cap removed upon image pickup by the camera section does not move danglingly to make an obstacle to image pickup and eliminates the possibility of missing. Therefore, the information processing apparatus can be used with augmented convenience of use, and a lens of the camera section can be protected with certainty when the camera section is not used.

Preferably, the information processing apparatus further comprises an image pickup lit lens which is lit upon image pickup by the camera section such that the image pickup lit lens can be visually observed by a user of the information processing apparatus. With the information processing apparatus, a person whose image is to be picked up can recognize through visual observation of the image pickup lit lens that an image of the person itself is picked up.

According to another aspect of the present invention, there is provided an information processing apparatus, comprising a computer body having a keyboard on which a plurality of operation keys are provided, a display section having a display screen thereon and supported on the computer body for pivotal motion around a fixed axis between a covering position in which the display section covers the computer body and an uncovering position in which the display section does not cover the computer body and for pivotal motion around a second axis extending perpendicularly to the first axis, the display section further having a frame portion for holding the display screen, and a jog dial mounted on the frame portion of the display section for being rotated by a rotating operation and being laterally moved bodily by a pressing operation.

With the information processing apparatus, when the display screen is viewed from the front, the jog dial is positioned normally at the same position as viewed from the user irrespective of whether the display section is pivoted or not pivoted with respect to the computer body. Therefore, the operation direction of the jog dial need not be changed in accordance with the form of use of the information processing apparatus, and consequently, good operability free from an unfamiliar feeling to the user can be assured and good convenience in use can be anticipated.

The information processing apparatus may further comprise a camera section provided on one of the opposite side edge portions of the computer body. With the information processing apparatus, when the display screen is viewed from the front, the jog dial is positioned normally at the same position as viewed from the user in both of a case wherein the information processing apparatus is used as a computer and another case wherein the information processing apparatus is used as a video camera. Therefore, the operation direction of the jog dial need not be changed irrespective of whether the information processing apparatus is used as a computer or as a video camera, and consequently, good operability free from an unfamiliar feeling can be assured and good convenience in use can be anticipated.

According to a further aspect of the present invention, there is provided an information processing apparatus, comprising a body having a keyboard on which a plurality of operation keys are provided, a display section having a display screen thereon and supported on the body for pivotal motion around a fixed axis between a covering position in which the display section covers the body and an uncovering position in which the display section does not cover the body and for pivotal motion around a second axis extending perpendicularly to the first axis, the display section having a pair of engaging holes formed on each of the opposite front and rear faces thereof, and a pair of lock pawls provided on the body for engaging with any pair of the engaging holes.

With the information processing apparatus, since the engaging holes are provided on the opposite front and rear faces of the display section and the lock pawls for engaging with the engaging holes are provided on the body, not only when the display section is locked in the covering position in the orientation wherein the display screen is opposed to the body but also when the display section is locked in the converting position in the orientation wherein the display section is directed to the front or outside, nothing projects from the display section, and therefore, good convenience in use is maintained. Particularly in such a case that a camera section is supported on the body and the display section is used as a viewfinder, the body does not make an obstacle to operation of the user. Further, since no projecting element is provided on the display section, the camera section can be operated readily.

Preferably, the lock pawls are mounted for pivotal motion between a locking position wherein the lock pawl projects from the body and a non-locking position wherein the lock pawls are retracted in the body. With the information processing apparatus, when the lock pawls are not used, they can be accommodated in the body, and therefore, the lock pawls do not make an obstacle to a key operation or the like by the user. Further, since the lock pawls can be engaged with the engaging holes by pivotal motion thereof and act in such a manner that the display section is pulled to the body side, the display section can be locked in a play-free state to the body.

Preferably, the information processing apparatus further comprises a lever mounted for sliding movement with respect to the body and operable from the outside of the body to slidably move to pivot the lock pawls, and a toggle spring for yieldably allowing the lever to be slidably move and resiliently holding the lever at any of the opposite ends of a range of the sliding movement of the lever. With the information processing apparatus, the lever can be slidably moved with certainty to each of the opposite ends of the range of the sliding movement thereof. Accordingly, the lock pawls which are pivoted by the lever are not left at an intermediate position different from the locking position and the non-locking position, but are held with certainty at the locking position wherein they project from the body or the non-locking position wherein they are accommodated in the body. Further, if the lock pawls in the locking position in which they project from the body are acted upon from the outside by force tending to pivot the locking pawls to the non-locking position, then the lock pawls can be pivoted a little toward the non-locking position because the toggle spring is yielded to decrease the distance between the two arms thereof, and therefore, otherwise possible damage to the lock pawls is prevented. Even when the display section is pivoted toward the uncovering position while the lock pawls remain in the locking position, the lock pawls can be engaged with the engaging holes.

Preferably, the engaging holes and the lock pawl are provided corresponding to the opposite side portions of an end portion of the display section opposite to an end portion at which the display section is supported for rotation around the first axis. With the information processing apparatus, otherwise possible rising of the opposite side portions of the display section in the locked state can be prevented with certainty. Therefore, in the locked state of the display section, such foreign articles as dust are prevented from being admitted between the body and the display section.

A camera section may be supported on the body. With the information processing apparatus, the display section can be used as a viewfinder to pick up a moving picture or a still picture. Further, the image picked up in this manner can be taken into the body and processed in various manners. Therefore, the information processing apparatus can be used in augmented convenience of use.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

Referring to FIGS. 1 to 5, there is shown an information processing apparatus to which the present invention is applied. The information processing apparatus is generally denoted by 1 and includes a computer body 2 and a display section 3. In the following description of the computer body 2, the leftward and rightward directions and the upward and downward directions are defined in a state wherein operation keys disposed on a keyboard are directed upwardly and the display section 3 is positioned on the rear side of the computer body 2.

Figure 1:
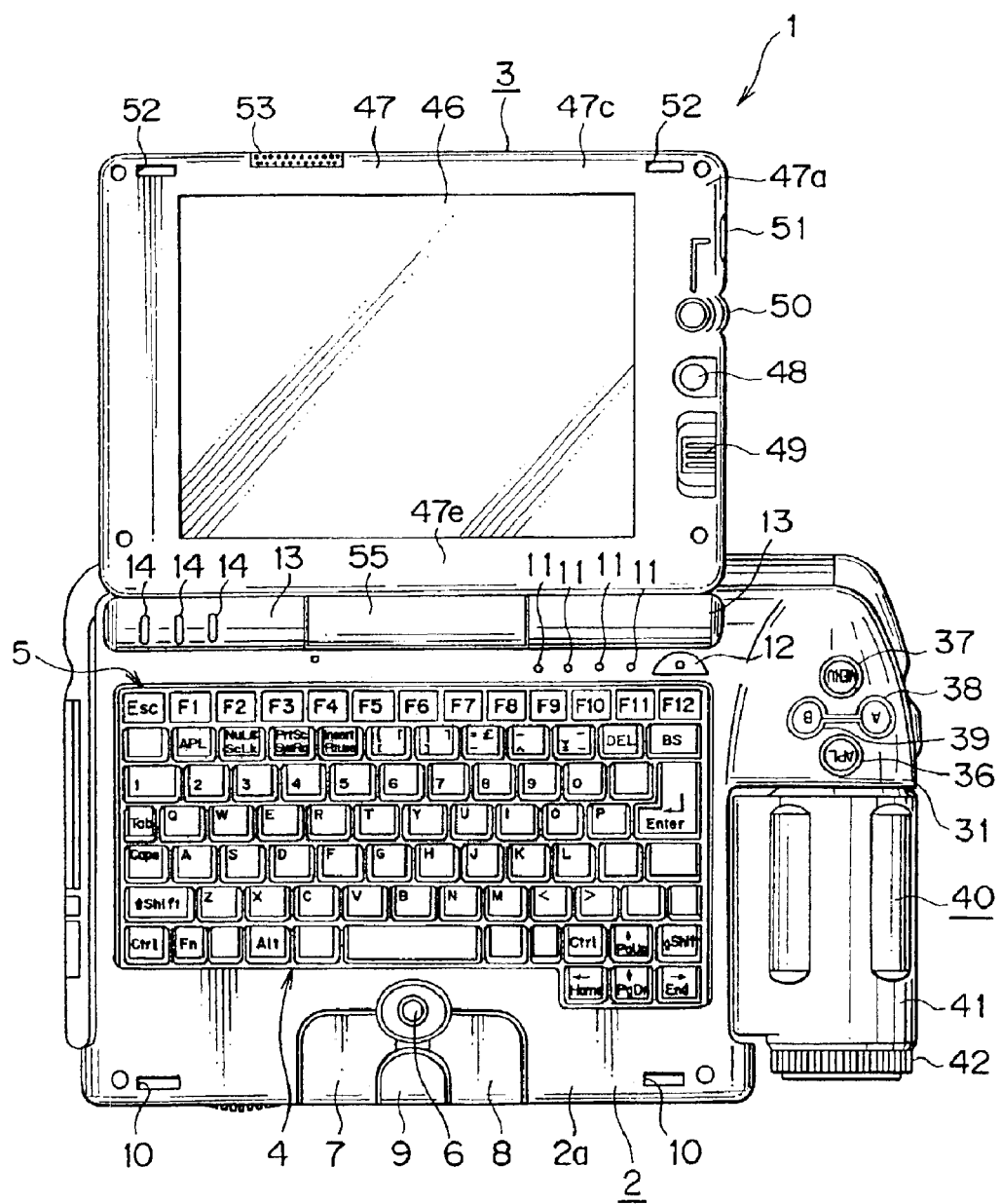
FIG. 1 is a top plan view of an information processing apparatus to which the present invention is applied with operation keys of a keyboard uncovered.
Figure 6:
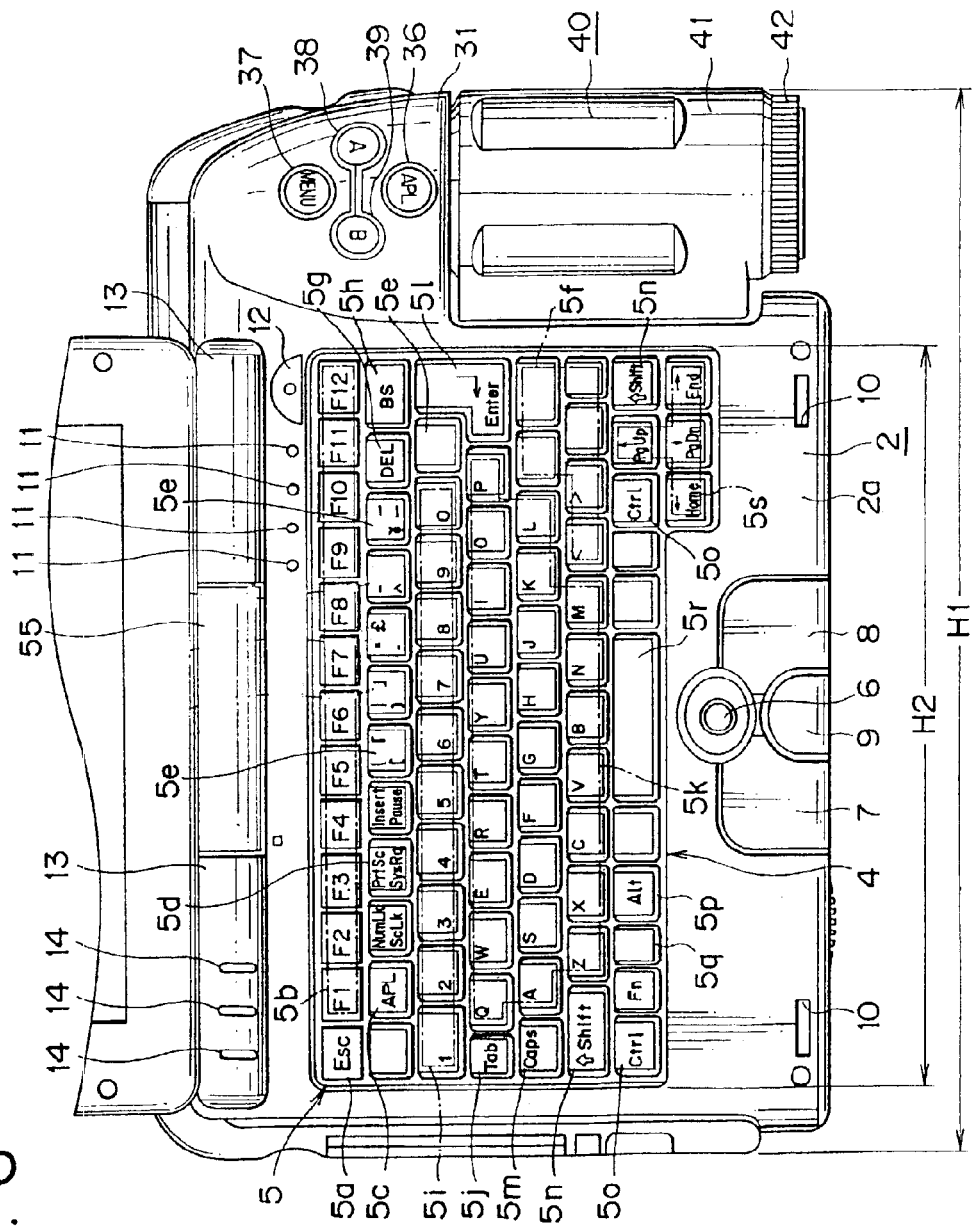
FIG. 6 is an enlarged top plan view showing a computer body of the information processing apparatus of FIG. 1.

A keyboard 4 is provided on an upper face 2a of the computer body 2, and a plurality of operation keys 5 are disposed on the keyboard 4 as seen in FIGS. 1 and 6. Processing elements including a central processing unit (CPU) and so forth are provided in the inside of the computer body 2 and perform various processes for a signal inputted by an operation of the operation keys 5 of the keyboard 4 and so forth.

The operation keys 5 are disposed adjacent each other in seven horizontal rows except those three operation keys 5 which are positioned at a position forwardly of and adjacent the right end of the area in which the other operation keys 5 are disposed as seen in FIGS. 1 and 6.

The operation keys 5 are divided into a plurality of different types as seen from FIG. 6.

In the rearmost row, that is, in the first row, an escape key 5a for returning the operation stage to a preceding stage and a plurality of function keys 5b (F1 to F12) for causing various functions to be executed are disposed.

The second row forwardly of the rearmost row includes an application key 5c for activating application software built in the information processing apparatus 1, a print screen key 5d for fetching a displayed image, a pair of symbol keys 5e, a delete key 5g and a backspace key 5h for deleting an inputted character, and so forth.

The third row forwardly of the second row includes a plurality of numeral keys 5i for inputting numerical values and a symbol key 5e.

The fourth row includes a tab key 5j for jumping a cursor to a predetermined position, and a plurality of alphabet keys 5k for inputting alphabetical letters. An enter key 5l for settling an input or the like is disposed at the right end of the third and fourth rows such that it extends across the third and fourth rows.

The fifth row includes a caps lock key 5m for converting an inputted character, a plurality of alphabet keys 5k.

The sixth row includes a shift key 5n used in combination with the other operation keys 5 for executing a particular function, a plurality of alphabet keys 5k.

The seventh row includes a pair of control keys 5o and an alt key 5p used in combination with the other operation keys 5 for executing a particular function, a windows key 5q for displaying a start menu of windows software, a space key 5r for inputting a space as a character and so forth, a shift key 5n, a movement key 5s for moving the cursor, and so forth.

The eighth row includes three movement keys 5s disposed adjacent the right end of the keyboard 4.

The operation keys 5 are disposed in such a manner as described above. The function keys 5b, numeral keys 5i and alphabet keys 5k are disposed in an arrangement quite same as that of operation keys of existing keyboards.

For example, if the horizontal width H1 (refer to FIG. 6) of the entire computer body 2 including a camera section which is hereinafter described is set to 249 mm equal to that of the conventional computer body c described hereinabove, then the horizontal width H2 (refer to FIG. 6) of the keyboard 4 is set to 178 mm taking the size of the camera section into consideration. Then, the key pitch which is the distance between the centers of adjacent ones of the operation keys 5 is 13.8 mm in the minimum assured as a result of modification to the arrangement of six rows of operation keys which is an arrangement state of operation keys of the existing keyboards.

Accordingly, in the information processing apparatus 1, since the operation keys 5 are disposed in such a manner as described above, miniaturization of the information processing apparatus 1 can be achieved while assuring a key pitch sufficient to maintain good operability.

The function keys 5b are normally operated but not by touch typing, and therefore, they are disposed in the first row, that is, in the rearmost row, while the other operation keys 5 which are operated by touch typing are disposed in the second and succeeding rows. Therefore, the arrangement of the operation keys 5 described above does not make an obstacle to touch typing operation, and good operability is maintained.

It is to be noted that, while the operation keys 5 of the keyboard 4 are disposed in seven horizontal rows or eight horizontal rows, they may otherwise be arranged in a greater number of horizontal rows if a key pitch sufficient to maintain good operability can be assured and good convenience of the user of the keyboard 4 can be assured.

A stick type pointing device 6 to be used to move a mouse cursor, a left click button 7 and a right click button 8 corresponding to the left button and the right button of a mouse, respectively, and a center button 9 for a scrolling operation are provided at a central portion in the leftward and rightward direction on a front end edge of the upper face 2a of the computer body 2 as seen in FIG. 1.

A pair of lock pawl insertion holes 10 are formed in a leftwardly and rightwardly spaced relationship from each other at a front end portion of the upper face 2a of the computer body 2 as seen in FIG. 1. As hereinafter described, a pair of locking pawls, which are hereinafter described, provided in the inside of the computer body 2 are projected upwardly through the lock pawl insertion holes 10 when necessary.

A plurality of indicators 11 are provided at a right end portion of the upper face 2a of the computer body 2 immediately rearwardly of the keyboard 4 as seen in FIG. 1. The indicators 11 individually indicate an access state of a plate-shaped recording medium which is hereinafter described, an operation state of the number lock key, an operation state of the caps lock key 5m, and a scroll lock state. A power supply button 12 is disposed on the right side of the indicators 11.

Figure 2:
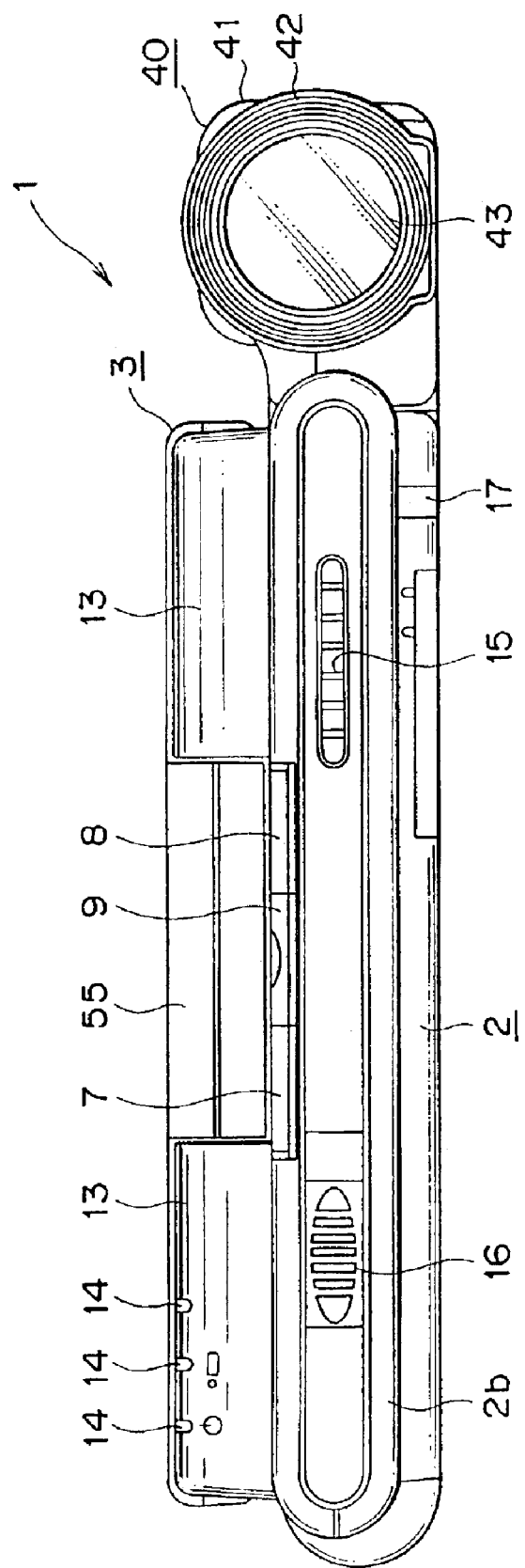
FIGS. 2 to 5 are a front elevational view, a left side elevational view, a bottom plan view and a right side elevational view, respectively, of the information processing apparatus of FIG. 1.

A pair of support projections 13 are provided in a projecting manner in a leftwardly and rightwardly spaced relationship from each other at a rear end portion of the upper face 2a of the computer body 2. The support projections 13 are elongated in the leftward and rightward directions as seen in FIGS. 1 and 2. Three indicators 14 are provided on the left side support projection 13 and individually indicate a power supply input state, a charged state of a battery which is hereinafter described, and a driven state of a hard disk (not shown) built in the computer body 2.

A heat radiation hole 15 is formed at a portion of a front wall 2b of the computer body 2 rather near to the right end as seen in FIG. 2. A fan not shown is disposed corresponding to the heat radiation hole 15 in the inside of the computer body 2. A slide element 16 is supported at a position of the front wall 2b rather near to the front wall 2b. If the slide element 16 is operated to slidably move leftwardly, then the lock pawls described above are projected upwardly through the lock pawl insertion holes 10. However, if the slide element 16 is operated to slidably move rightwardly, then the projecting lock pawls are retracted into the computer body 2. Further, an image pickup lit lens 17 is provided at a position of the computer body 2 rather near to the right end such that it extends from the front wall 2b to the bottom of the computer body 2 and can be visually observed by the user. The image pickup lit lens 17 is lit when the camera section which is hereinafter described is used to pick up an image so that an object person of such image pickup can recognize through the visual observation of the image pickup lit lens 17 that an image of the object person itself is picked up.

Figure 3:
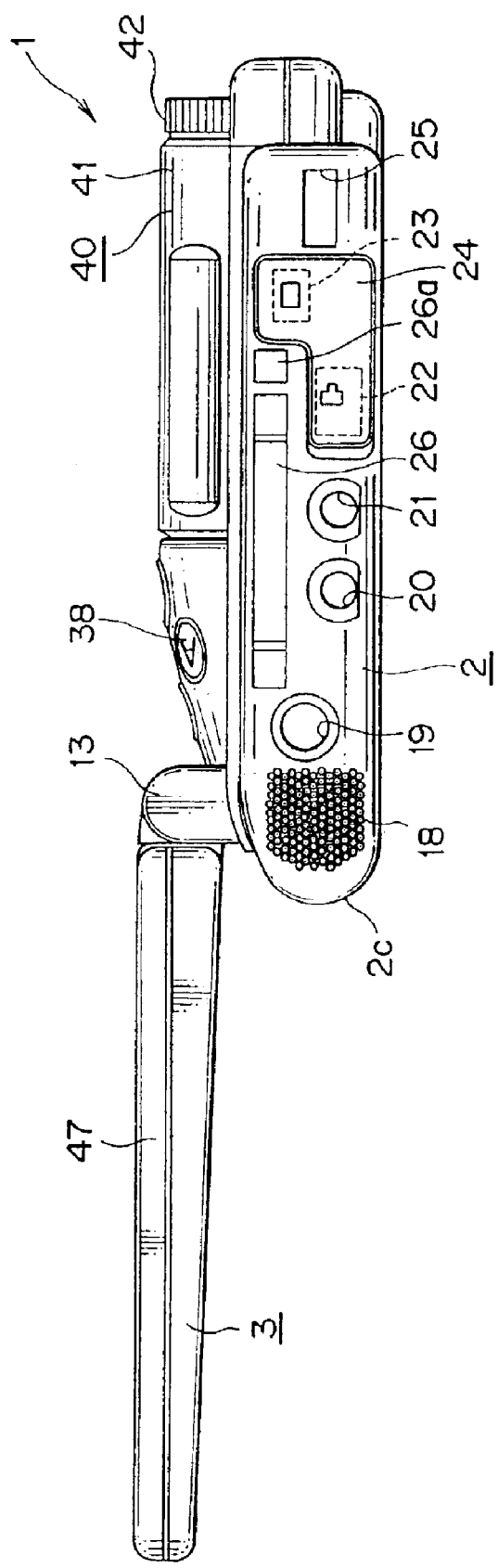

A stereo speaker 18, a DC jack 19 to which an AC adapter is to be connected, a LINE-IN/MIC connector 20 for connection to various recording and/or playback equipments and microphones, and a headphone jack 21 for connection of a headphone are provided in order from the rear side on a left side wall 2c of the computer body 2 as seen in FIG. 3. Forwardly of the headphone jack 21, a modem terminal 22 for a modular jack and a VGA (Video Graphics Array) OUT connector 23 for connection of a monitor are provided on the left side wall 2c. The modem terminal 22 and the VGA OUT connector 23 are protected with a cover 24 when they are not used. A USB (Universal Serial Bus) terminal 25 is provided at a front-end portion of the left side wall 2c. Furthermore, a card slot 26 into which a PC card is to be inserted is provided on the left side wall 2c, and an eject button 26a for ejecting a PC card inserted in the card slot 26 is provided in the proximity of the card slot 26.

Figure 4:
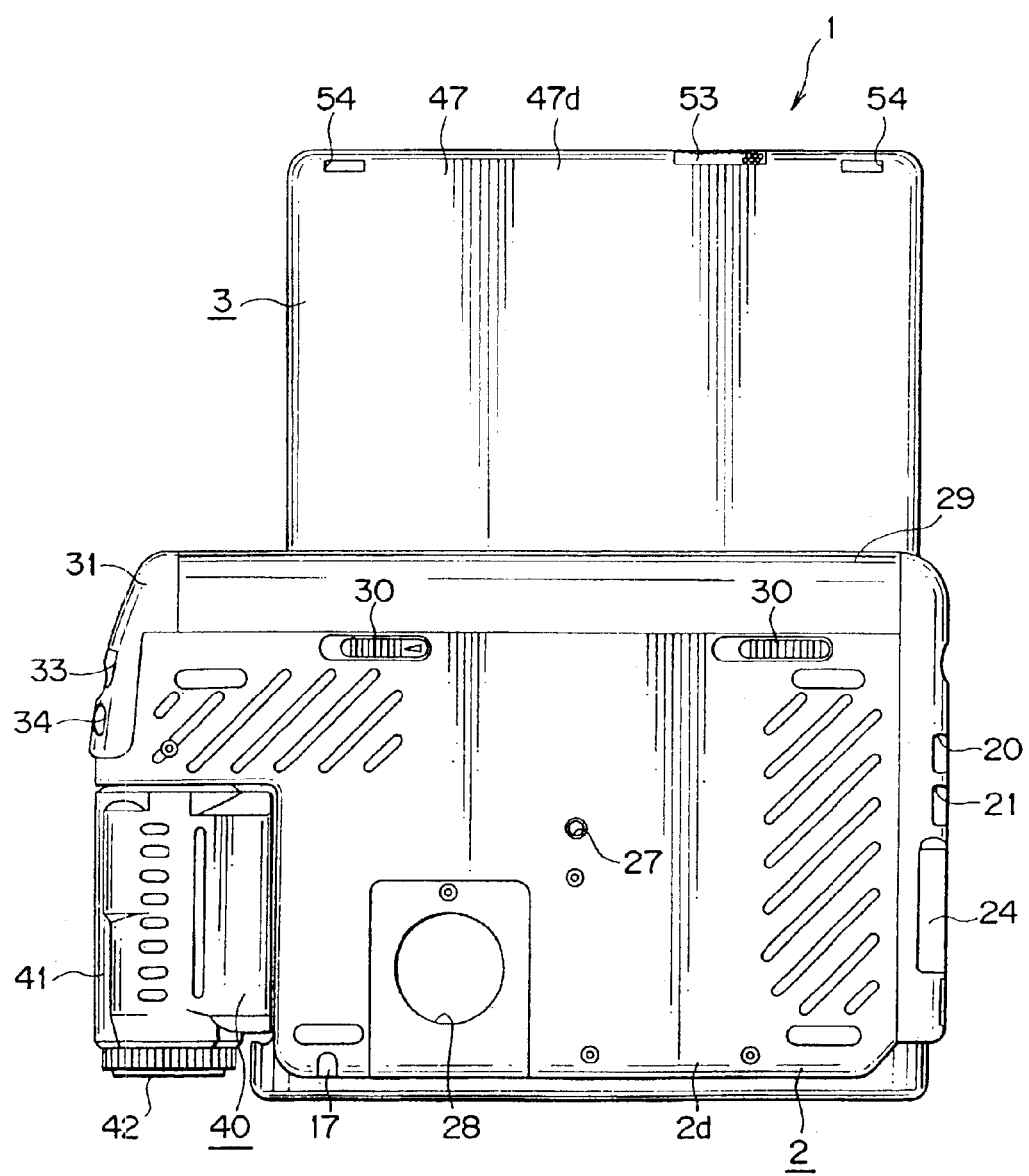

A tripod threaded hole 27 is formed at a substantially central portion of a bottom wall 2d of the computer body 2 as seen in FIG. 4. The tripod threaded hole 27 is a hole for receiving a tripod. For example, upon image pickup by the camera section which is hereinafter described, if a tripod is secured to the tripod threaded hole 27 to fix the information processing apparatus 1, for example, fixed-point survey can be performed. In this manner, augmentation in application of the information processing apparatus 1 can be anticipated.

A holding recess 28 for holding a lens projecting cap of the camera section which is hereinafter described is formed at a position of the bottom wall 2d of the computer body 2 rather near to the front end as seen in FIG. 4.

A battery pack 29 in which a battery is mounted is removably provided at a rear end portion of the computer body 2 as seen in FIG. 4. A pair of battery knobs 30 are supported in a leftwardly and rightwardly spaced relationship from each other for sliding movement at a rear end portion of the bottom wall 2d. The battery pack 29 mounted can be locked to the computer body 2 or can be removed from the computer body 2 by slidably operating the battery knobs 30 in predetermined directions.

Figure 5:
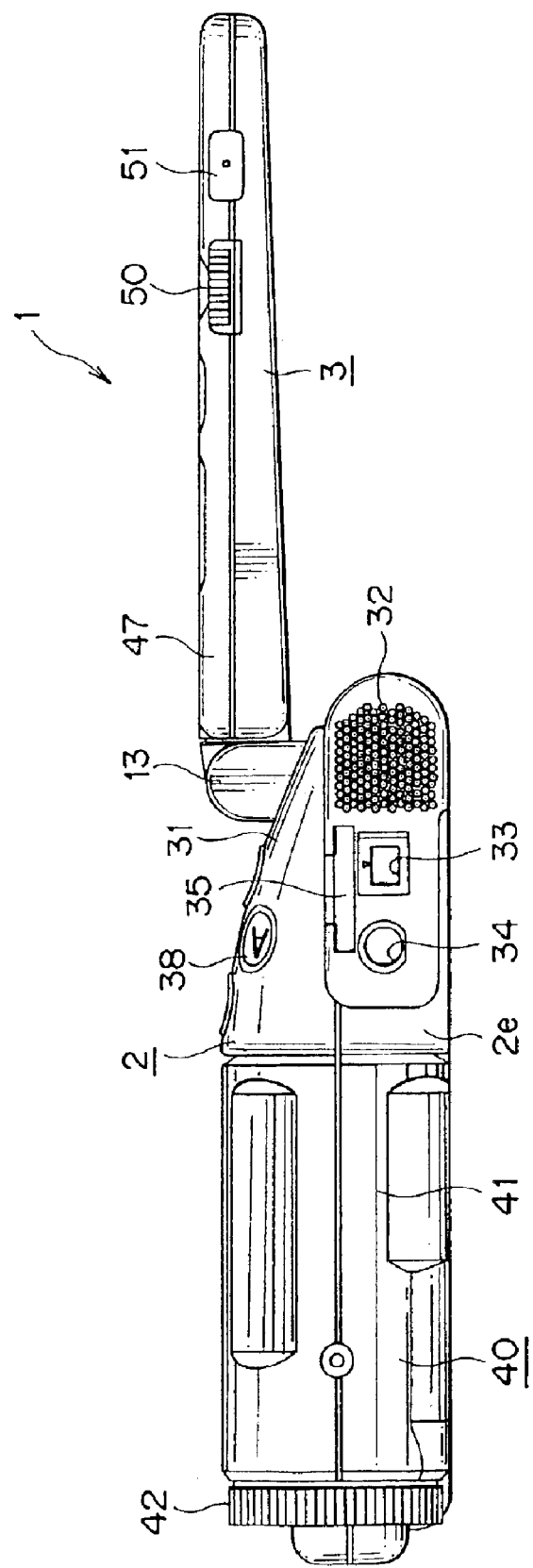

A rear end portion of a right end portion of the computer body 2 extends rightwardly and forms a button arrangement portion 31 as seen in FIGS. 1, 4 and 5. A stereo speaker 32, an IEEE (Institute of Electrical and Electronics Engineers) 1394 terminal 33 for 4 pins for connection to a video deck or the like and an AV OUT terminal 34 for connection to a television set are provided in order from the rear side on a side face of the button arrangement portion 31, or more particularly, a right side wall 2e of the computer body 2. Further, a slot 35 into which a recording medium in the form of a plate is to be inserted is provided on the right side wall 2e.

An application button 36 is provided at a front position of an upper face of the button arrangement portion 31, and a menu button 37 is provided on the rear side of the application button 36 on the upper face of the button arrangement portion 31. Further, an A button 38 and a B button 39 are provided on the right side and the left side, respectively, between the application button 36 and the menu button 37 as seen in FIG. 1. The buttons 36, 37, 38 and 39 are used upon image pickup by the camera section and have such functions as hereinafter described.

A camera section 40 having a CCD (Charge Coupled Device) image pickup element is provided forwardly of the button arrangement portion 31 and is supported for pivotal motion on the computer body 2 by a shaft not shown provided on the right side face of the computer body 2 near to the front end of the computer body 2 as seen in FIGS. 1, 2, 4 and 5. The camera section 40 has such high performance functions as, for example, an optical 10-fold zoom function, a hand-shake correction function and an automatic focusing function.

Figure 12:
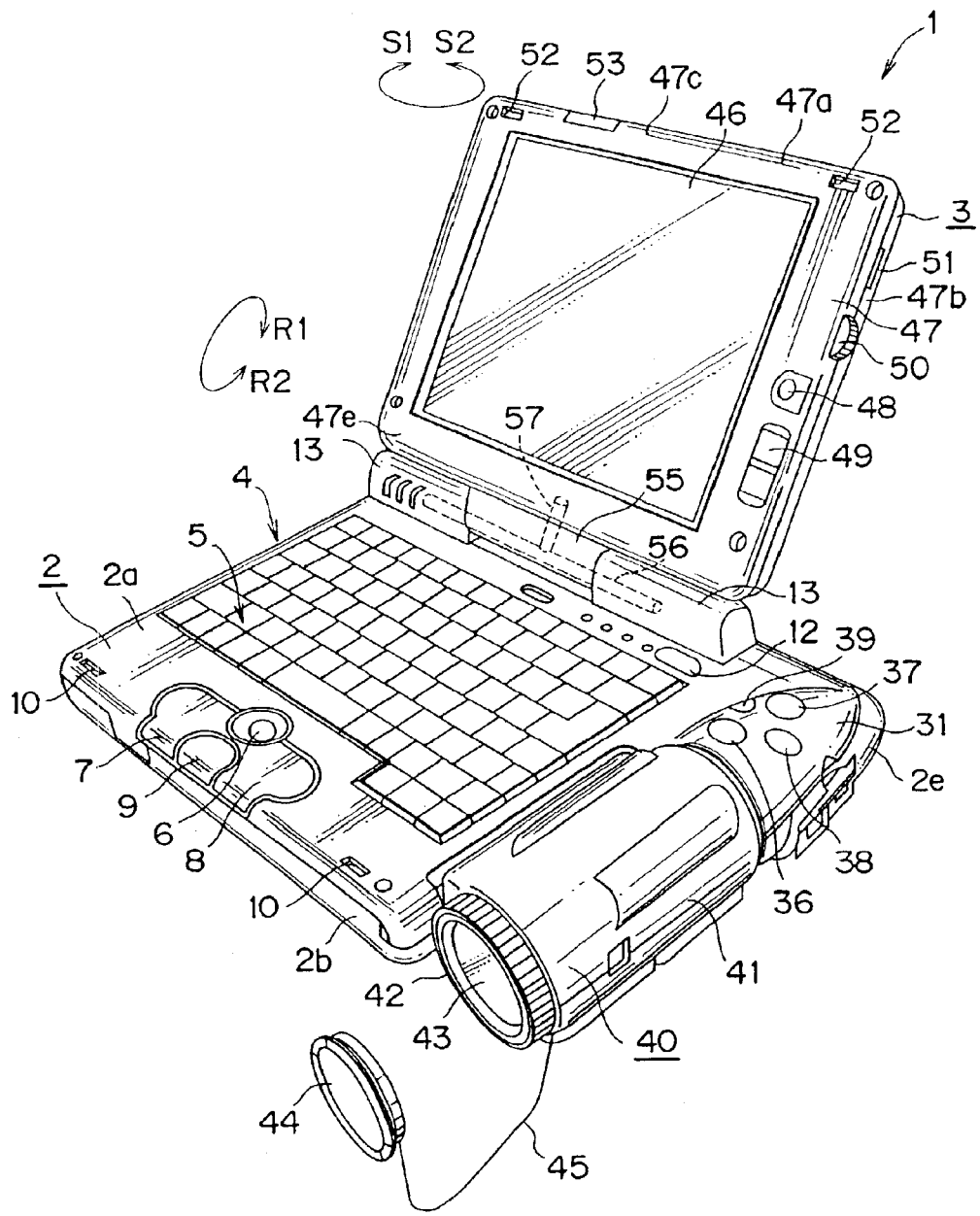
FIG. 12 is a perspective view of the information processing apparatus of FIG. 1 when it is used as a computer.

The camera section 40 includes a lens barrel 41 and a focusing ring 42 provided at one end portion of the lens barrel 41, and a required set of lenses is disposed in the lens barrel 41. The camera section 40 includes a removable lens protecting cap 44 for protecting the front lens 43. The lens protecting cap 44 is attached to an end portion of a string 45 connected to the lens barrel 41 as seen in FIG. 12.

The lens protecting cap 44 removed upon image pickup of the camera section 40 can be inserted into and held by the holding recess 28 formed on the bottom wall 2d of the computer body 2. Accordingly, the lens protecting cap 44 removed upon image pickup by the camera section 40 does not move danglingly to make an obstacle to image pickup and eliminates the possibility of missing. Therefore, augmentation of the convenience of use of the information processing apparatus 1 can be anticipated, and the front lens 43 can be protected with certainty when the camera section 40 is not used.

A display screen 46 having a liquid crystal display (LCD) unit is provided on the display section 3, and a peripheral portion of the display section 3 around the display screen 46 is formed as a frame portion 47 as seen in FIG. 1. It is to be noted that, in the following description of the display section 3, the leftward and rightward directions are defined in a state wherein the display screen 46 is directed forwardly or upwardly, and the side on which the display section 3 is supported is defined as the first end side while the other side is defined as the second end side. Further, the face of the display section 3 on which the display screen 46 is provided is defined as the front face while the opposite face is defined as the rear face.

A capture button 48 which functions as an image pickup button and a zoom knob 49 for changing the angle of view are provided at a right end portion of a front face 47a of the frame portion 47 as seen in FIG. 1. When the capture button 48 is depressed in a half-depressed state, focusing adjustment of an image to be picked up by the camera section 40 is performed, but when the capture button 48 is depressed fully, the focusing-adjusted image is picked up. On the other hand, when the zoom knob 49 is slidably operated, a zooming function (wide or telescopic) is exhibited to change the angle of view. It is to be noted that, when the zoom knob 49 is slidably moved to the second end side, the Wide (wide-angle) zoom function is exhibited, but when the zoom knob 49 is slidably moved to the one end side, the Tele (telescopic) zoom function is exhibited.

Figure 7:
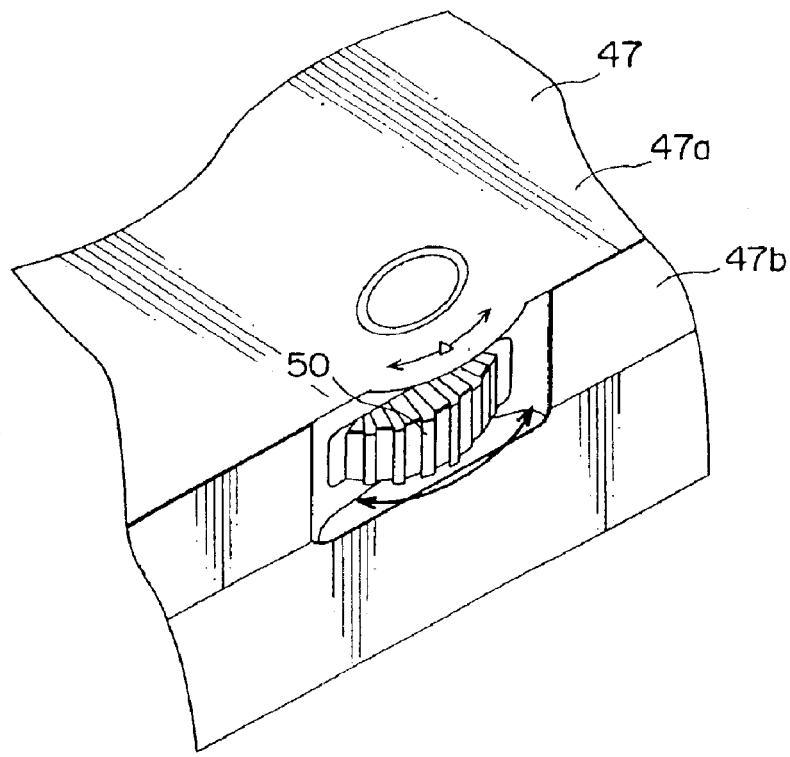
FIGS. 7 and 8 are enlarged perspective views illustrating a rotating operation method and a pressing operation method, respectively, of a jog dial of the information processing apparatus of FIG. 1.
Figure 8:
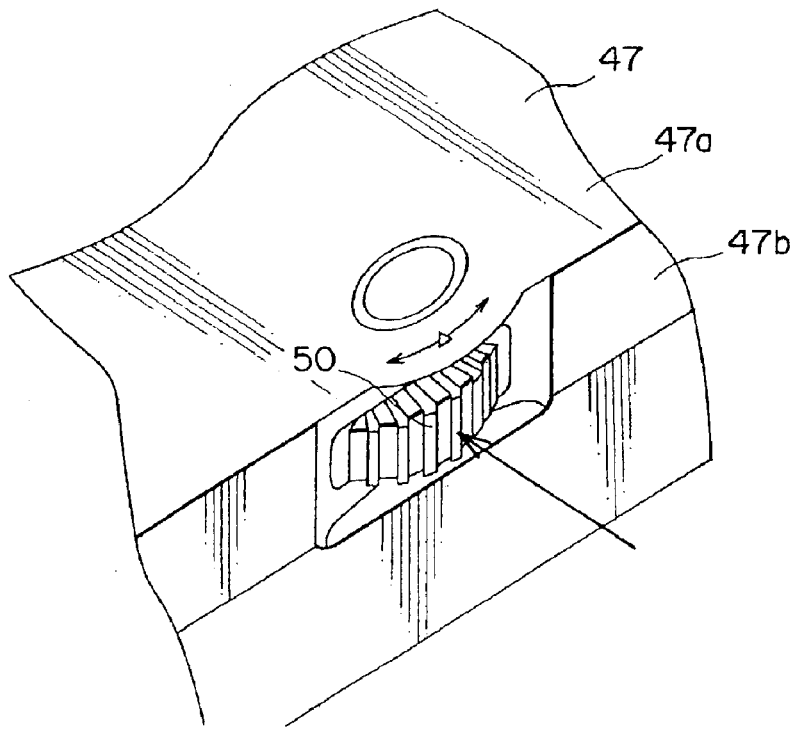

A jog dial 50 is provided on a right side face 47b of the frame portion 47 such that it partially projects from the right side face 47b as seen in FIGS. 1, 5, 7 and 8. If the jog dial 50 is rotated by an operation thereof as seen in FIG. 7, then, for example, menus of application software on a window for a jog dial displayed on the display screen 46 are scrolled, but if the jog dial 50 is pressed by an operation toward the axis of rotation of the jog dial 50 as seen in FIG. 8, then the selected menu is executed. It is to be noted that, although, in the information processing apparatus 1, the window for a jog dial is normally displayed on the display screen 46, it is otherwise possible to construct the information processing apparatus 1 such that the window is closed after lapse of a fixed interval of time after it is displayed.

When the user operates the jog dial 50 to rotate, a slight catch feeling, that is, a click feeling, is provided to the user for each rotation of a predetermined angle. Accordingly, upon operation of the jog dial 50, the amount of operation is recognized through the tactile sense by the user.

On the window for a jog dial described above, for example, such menus as "manual", "xx software", and "ΔΔ software" are displayed. Thus, it is possible to select one of the menus by a rotating operation of the jog dial 50 and cause the selected menu to be executed by a pressing operation of the jog dial 50 to perform, for example, adjustment of the brightness of the display screen 46, setting of the sound volume of the stereo speaker 18 or 32, setting of the picture quality or the mode (still picture or moving picture) of the camera section 40 and so forth.

Setting regarding the camera section 40 is performed by execution of predetermined application software (hereinafter referred to as "software A"). Execution of the software A is performed by an operation of the jog dial 50, and by execution of the software A, selection between a still picture mode and a moving picture mode, selection of an arbitrary still picture displayed on the display screen 46, selection of an arbitrary moving picture displayed on the display screen 46, scrolling of a still picture and a moving picture, and playback, pause and so forth of moving pictures can be performed.

A back knob 51 is provided on the right side face 47b of the frame portion 47 nearer to the second end side than the jog dial 50 as seen in FIGS. 1 and 5. The back knob 51 has a function of restoring a preceding layer of a selected menu when the jog dial 50 is operated in error.

Figure 9:
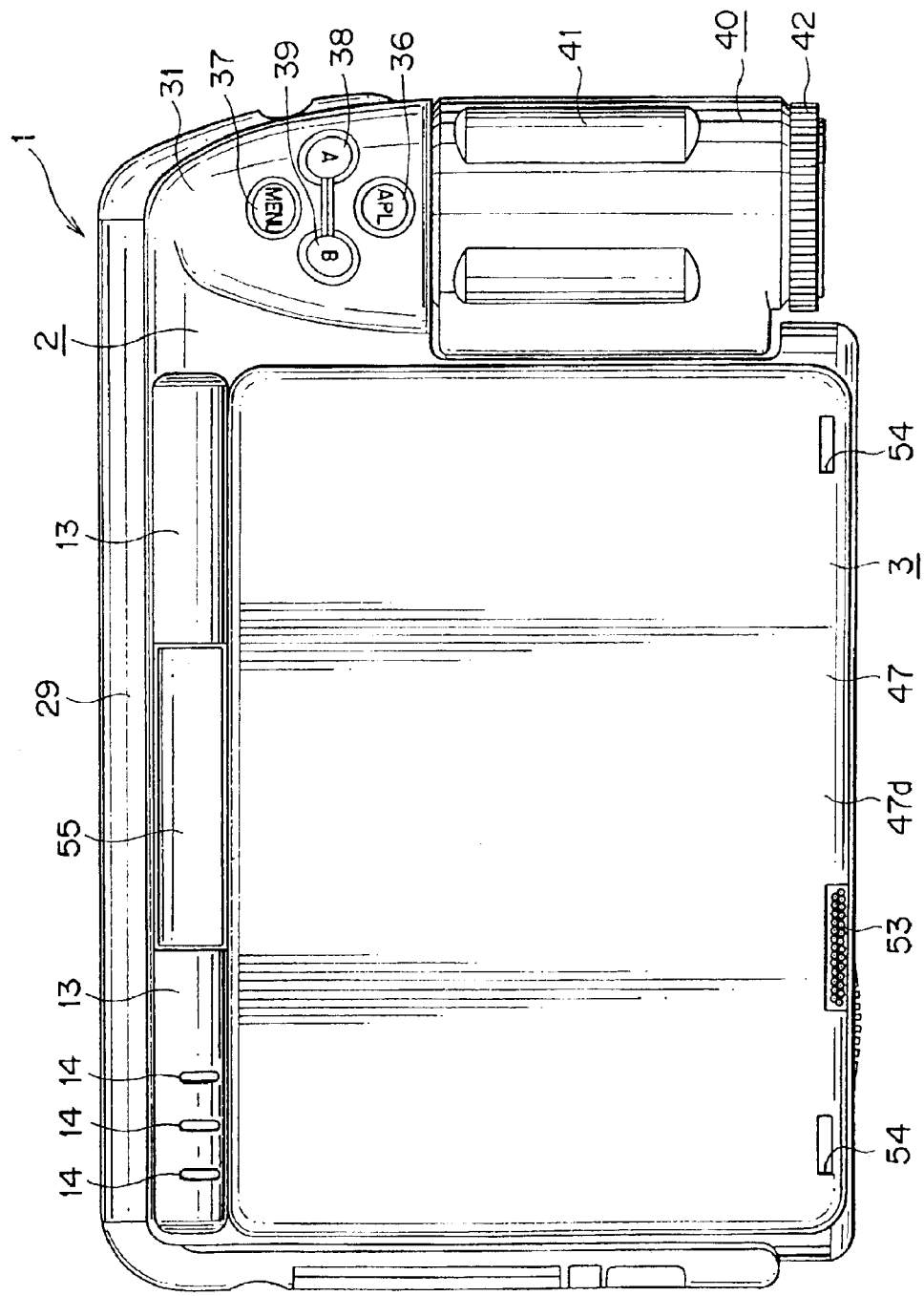
FIG. 9 is a top plan view showing the information processing apparatus wherein the operation keys of the keyboard are covered up with a display section with the keyboard opposed to a display screen of the display section.

A pair of engaging holes 52 are formed in a leftwardly and rightwardly spaced relationship from each other at a second end portion 47c of the front face 47a of the frame portion 47. The engaging holes 52 are engaged with the lock pawls projected upwardly from the lock pawl insertion holes 10 of the computer body 2 when the display section 3 in a covering or closing position in which it covers or closes up the keyboard 4 with the display screen 46 opposed to the keyboard 4 as seen in FIG. 9 thereby to lock the display section 3 in the covering position. A microphone 53 is provided on the second end portion 47c of the frame portion 47 as seen in FIGS. 1 and 4.

Figure 10:
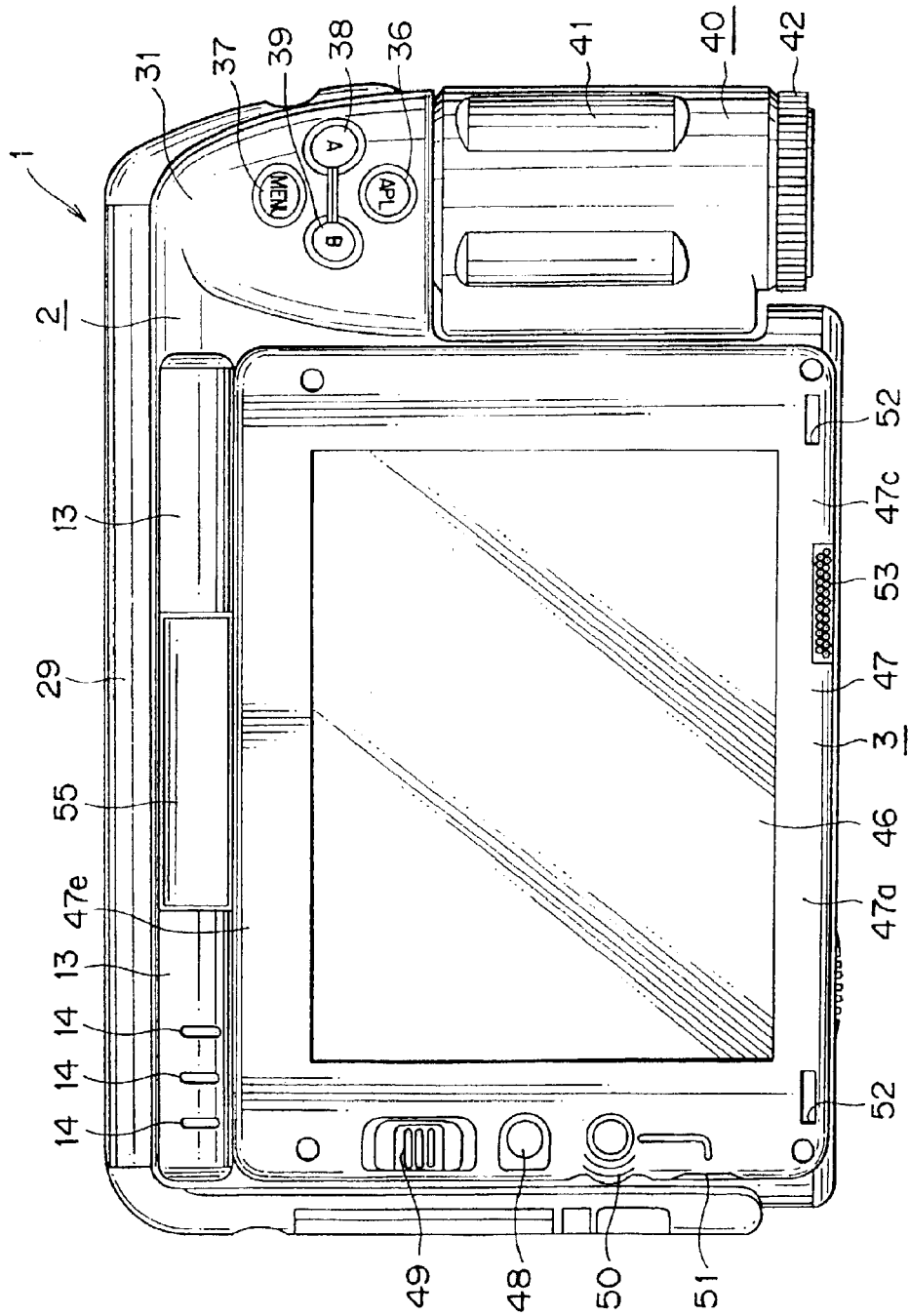
FIG. 10 is a top plan view showing the information processing apparatus wherein the operation keys are covered up with the display section with the keyboard opposed to a face of the display section opposite to the display screen.

A pair of engaging holes 54 are formed in a leftwardly and rightwardly spaced relationship from each other at the second end portion 47c of a rear face 47d of the frame portion 47 as seen in FIG. 4. The engaging holes 54 are engaged with the lock pawls projected upwardly from the lock pawl insertion holes 10 of the computer body 2 when the display section 3 is in its covering position in which it covers the keyboard 4 with the rear face 47d opposed to the keyboard 4 as seen in FIG. 10 thereby to lock the display section 3 in the covering position.

When the display section 3 is pivoted from a position wherein it does not cover the keyboard 4 to the covering position, if the lock pawls are in a position projected upwardly from the lock pawl insertion holes 10, then the lock pawls are automatically engaged with the engaging holes 52 or the engaging holes 54 to lock the display section 3. However, when the display section 3 is pivoted from the position wherein it does not cover the keyboard 4 to the covering position, if the lock pawls are not in the position projected from the lock pawl insertion holes 10, then if the slide element 16 provided on the front wall 2b of the computer body 2 is operated to slidably move leftwardly in a state wherein the computer body 2 and the display section 3 contact with each other, then the lock paws are projected upwardly through the lock pawl insertion holes 10 and engaged with the engaging holes 52 or the engaging holes 54 to lock the display section 3.

It is to be noted that, in order to release the display section 3 from the locked state, the slide element 16 is operated to slidably move rightwardly. Thereupon, the lock pawls are retracted into the computer body 2 to cancel the locking.

Details of a lock pawl unit having the lock pawls and a mechanism for operating the lock pawls and operation of the lock pawl unit are hereinafter described in detail.

A support member 55 elongated in the leftward and rightward directions extends between the support projections 13 provided at the rear end portion of the computer body 2, and the display section 3 is supported on the computer body 2 by the support member 55 as seen in FIGS. 1, 2 and 12. In particular, a first support shaft 56 is provided in the support member 55 and extends in the leftward and rightward directions through the support projections 13. The support member 55 is mounted for rotation with respect to the support projections 13 by the first support shaft 56. The display section 3 is supported for pivotal motion with respect to the support member 55 by a second support shaft 57 extending perpendicularly to the first support shaft 56 as seen in FIG. 12. Accordingly, the display section 3 can be pivoted in the directions of a double-sided arrow mark R1–R2 shown in FIG. 12 integrally with the support member 55 with respect to the support projections 13 around the axis of the first support shaft 56 and can be pivoted in the directions of another double-sided arrow mark S1–S2 shown in FIG. 12 with respect to the support member 55 by the second support shaft 57.

Figure 11:
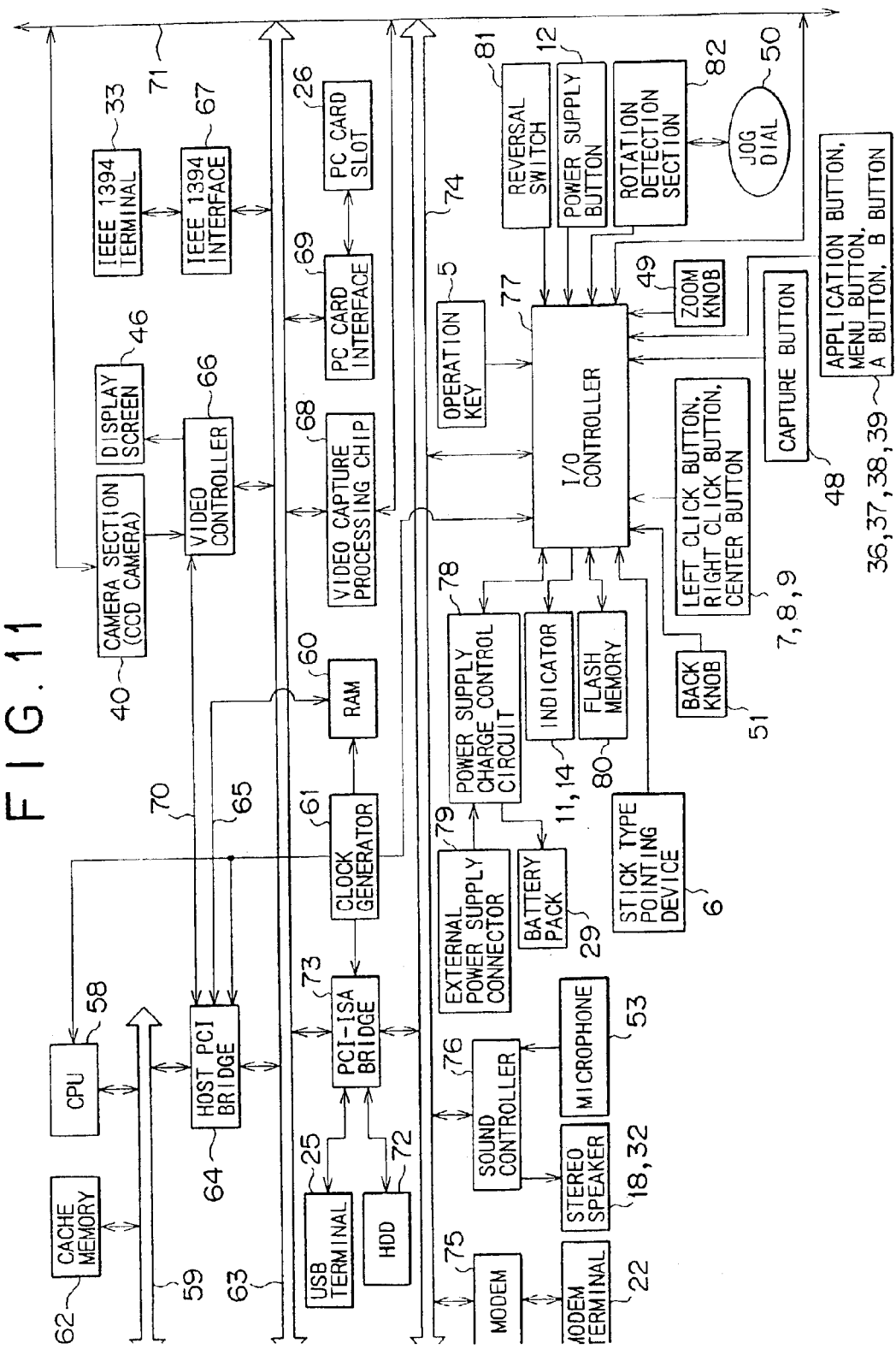
FIG. 11 is a block diagram showing a circuit configuration of the information processing apparatus of FIG. 1.

In the following, a circuit configuration of the information processing apparatus 1 is described with reference to FIG. 11.

The computer body 2 includes a CPU 58 for controlling various functions thereof. The CPU 58 is connected to a host bus 59. The CPU 58 executes processes in accordance with various programs or software loaded in a RAM (Random Access Memory) 60 at a predetermined operation speed based on a system clock signal received from a clock generator 61 to achieve various functions.

A cache memory 62 is connected to the host bus 59 and caches data to be used by the CPU 58 thereby to achieve high speed accessing.

The host bus 59 is connected to a PCI (Peripheral Component Interconnect) bus 63 through a host PCI bridge 64. The host PCI bridge 64 is connected to the RAM 60 by a memory bus 65.

A video controller 66, an IEEE 1394 interface 67, a video capture processing chip 68 and a PC card interface 69 are connected to the PCI bus 63.

The host PCI bridge 64 controls transfer of various data performed between the CPU 58 and the video controller 66, IEEE 1394 interface 67, video capture processing chip 68 or PC card interface 69 and controls the RAM 60 connected thereto by the memory bus 65. The host PCI bridge 64 is connected to the video controller 66 by a signal line extending along an AGP (Accelerated Graphics Port) 70 so that image data can be transferred at a high rate between the host PCI bridge 64 and the video controller 66.

The video capture processing chip 68 is connected to an SM (System Management) bus 71 which is a serial bus. When image data picked up by the camera section 40 are supplied to the video capture processing chip 68 over the SM bus 71, the image data are stored once into a frame memory not shown built in the video capture processing chip 68 and then are subject to image compression processing in accordance with the JPEG (Joint Photographic Experts Group) standards so that JPEG image data are produced. The thus produced JPEG image data are stored into the frame memory again.

The video capture processing chip 68 transfers JPEG image data stored in the frame memory to the RAM 60 using a bus master function in response to an instruction signal issued from the CPU 58, and transfers the JPEG image data as JPEG image data (still picture data) or motion JPEG image data (moving picture data) to a hard disk drive (HDD) 72.

The video controller 66 performs predetermined graphics processing for image data picked up by the camera section 40 or for JPEG image data produced by the video capture processing chip 68, stores resulting data into a VRAM (Video Random Access Memory) not shown built therein and suitably reads out the data, and displays an image of the data on the display screen 46 having an LCD. Further, the video controller 66 outputs image data based on various kinds of application software supplied thereto to the display screen 46 so that the image data are displayed on a plurality of window screens.

The PC card interface 69 is connected to the card slot 26 and is mounted through a PC card in order to add an optional function. The PC card interface 69 is connected to an external device such as a CD-ROM Compact Disk-Read Only Memory) drive or a DVD (Digital Versatile Disk) drive through the PC card.

The IEEE 1394 interface 67 is connected to the IEEE 1394 terminal 33 such that it is connected to an external device such as, for example, another computer apparatus or a digital camera through the IEEE 1394 terminal 33.

The PCI bus 63 is connected to an ISA bus 74 through a PCI-ISA (Industrial Standard Architecture) bridge 73, and the HDD 72 and the USB terminal 25 are individually connected to the PCI-ISA bridge 73. The PCI-ISA bridge 73 is formed from an IDE (Integrated Drive Electronics) interface, a configuration register, an RTC (Real Time Clock) circuit, a USB interface and so forth and controls the HDD 72 through the IDE interface based on a system clock received from the clock generator 61.

A hard disk of the HDD 72 has an OS (Operating System), an electronic mail program, an automatic pilot program and various kinds of application software stored thereon. The application software and so forth are transferred from the HDD 72 to the RAM 60 in the procedure of a startup process. The PCI-ISA bridge 73 controls an external device connected thereto through the USB terminal 25 such as a floppy disk drive, a printer or a USB mouse through a USB interface and controls a modem 75 and a sound controller 76 connected to the ISA bus 74. The modem 75 is connected to the modem terminal 22, and the sound controller 76 is connected individually to the stereo speaker 18 or 32 and the microphone 53.

The modem 75 is connected to an Internet service provider through the modem terminal 22 over a telephone network and the Internet. The sound controller 76 fetches a sound signal through the microphone 53 and outputs the sound signal to the stereo speaker 18 or 32.

An I/O (Input/Output) controller 77 is connected to the ISA bus 74, and power from an external power supply connector 79 is supplied to the ISA bus 74 through a power supply charge control circuit 78 such that required power is supplied to pertaining components of the information processing apparatus 1 when the power supply button 12 is turned on. The I/O controller 77 is connected to the clock generator 61 such that it operates based on a system clock signal supplied thereto from the clock generator 61. The power supply charge control circuit 78 is controlled by the I/O controller 77 to control charging of a battery of the battery pack 29.

The I/O controller 77 is formed from a microcontroller, an I/O interface, a CPU, a ROM, a RAM and so forth and controls inputting/outputting of data between the OS or application software and a peripheral equipment such as the display screen 46 or the HDD 72 based on a BIOS (Basic Input Output System) stored in a flash memory 80.

The I/O controller 77 is connected to a reversal switch 81. When the camera section 40 is pivoted in a predetermined direction with respect to the computer body 2, the reversal switch 81 is switched on, and this signal is inputted through the PCI-ISA bridge 73 and the host PCI bridge 64 to the CPU 58. Consequently, an image displayed on the display screen 46 is reversed (upside down).

The I/O controller 77 is connected also to the capture button 48 such that, when the capture button 48 is depressed to its half-depressed position or the fully depressed position, a corresponding signal is inputted to the CPU 58, whereupon a predetermined mode is established by the CPU 58.

In particular, if the capture button 48 is depressed to the half-depressed position after predetermined software for image pickup is transferred from the hard disk of the HDD 72 to the RAM 60, then a still picture mode is established and a still picture is frozen. However, if the capture button 48 is depressed to the fully depressed position, then the frozen still picture data are fetched and signaled to the video controller 66. Further, when the capture button 48 is depressed to the half-depressed position, focusing adjustment is performed as described hereinabove. It is to be noted that such focusing adjustment can be performed also by a manual operation of rotating the focusing ring 42 of the camera section 40.

On the other hand, if the capture button 48 is depressed to the fully depressed position while the predetermined software for image pickup is not transferred to the RAM 60, then a moving picture mode is established, and moving picture data are fetched and signaled to the video controller 66.

The ROM of the I/O controller 77 has various programs including a jog dial supervision program, a key input supervision program, and an indicator control program stored herein. The jog dial supervision program is used to supervise the states of a rotating operation and a pressing operation of the jog dial 50. The key input supervision program is used to supervise inputting through the operation keys 5, stick type pointing device 6, left click button 7, right click button 8, center button 9 and so forth. The indicator program is used to control lighting/extinction of the indicators 11 and the indicators 14.

The I/O controller 77 is connected to the jog dial 50 through a rotation detection section 82. If a menu is selected and determined by a rotating operation and a pressing operation of the jog dial 50, then the I/O controller 77 stores a rotating operation flag and a pressing operation flag into I/O registers stored in the RAM thereof and signals a representative of the menu to the CPU 58.

The CPU 58 starts up application software corresponding to the determined menu in accordance with the jog dial utility program, which has been read out and is operating in the RAM 60, to execute predetermined processing.

The I/O controller 77 is connected individually to the application button 36, menu button 37, A button 38 and B button 39 such that it executes a predetermined function in response to an operation of any of the buttons 36, 37, 38 and 39.

It is to be noted that, also when the power supply button 12 is off and the OS is not operating, the I/O controller 77 is normally operating in accordance with the jog dial supervision program under the control of the power supply charge control circuit 78 so that it can start up application software or the like determined by an operation of the jog dial 50.

The I/O controller 77 is further connected to the SM bus 71 such that, when various parameters for the camera section 40 set through the operation keys 5 or the jog dial 50 are supplied to the I/O controller 77 through the SM bus 71, the I/O controller 77 can control switching on/off of power supply to the camera section 40 and adjust the brightness, contrast and so forth.

The I/O controller 77 further has a program for supervising an operation state of the zoom knob 49 and the back knob 51 and signals a signal representative of an operation of the zoom knob 49 or the back knob 51 to the CPU 58.

Now, a lock pawl unit 83 for operating the lock pawls which are projected or retracted through the lock pawl insertion holes 10 described hereinabove to lock the display section 3 in a state wherein the display section 3 covers over the upper face 2*a* of the computer body 2 is described principally with reference to FIGS. 25 to 29.

The front wall 2*b* of the computer body 2 is formed from the lock pawl unit 83. In particular, the lock pawl unit 83 includes a horizontally elongated front panel 84 which forms the front wall 2*b* of the computer body 2, and when the lock pawl unit 83 is attached to a front end of a portion of the computer body 2 except the front wall 2*b*, the front panel 84 makes up the front wall 2*b* of the computer body 2.

The front panel 84 is formed from a molded part of a synthetic resin, and has the heat radiation hole 15 formed at a portion rather near to the right end thereof while a leftwardly and rightwardly elongated recess 85 is formed on a front face at a portion rather near to the left end of the front panel 84. A leftwardly and rightwardly elongated insertion hole 86 is formed at a substantially central portion in the upward and downward direction of the recess 85. Three mounting bosses 87 are formed on the front panel 84 such that they project rearwardly. The front panel 84 further has a plurality of positioning holes 88 (only two are shown in FIG. 26) formed therein as seen in FIG. 26.

A base plate 89 formed from a metal plate material is secured to the rear side of the front panel 84. The base plate 89 has three screw insertion holes 90 formed therein as seen in FIG. 26 such that screws 91 are inserted through the screw insertion holes 90 from rearwardly and screwed into rear ends of the mounting bosses 87 of the front panel 84 to secure the base plate 89 to the front panel 84.

Figure 26:
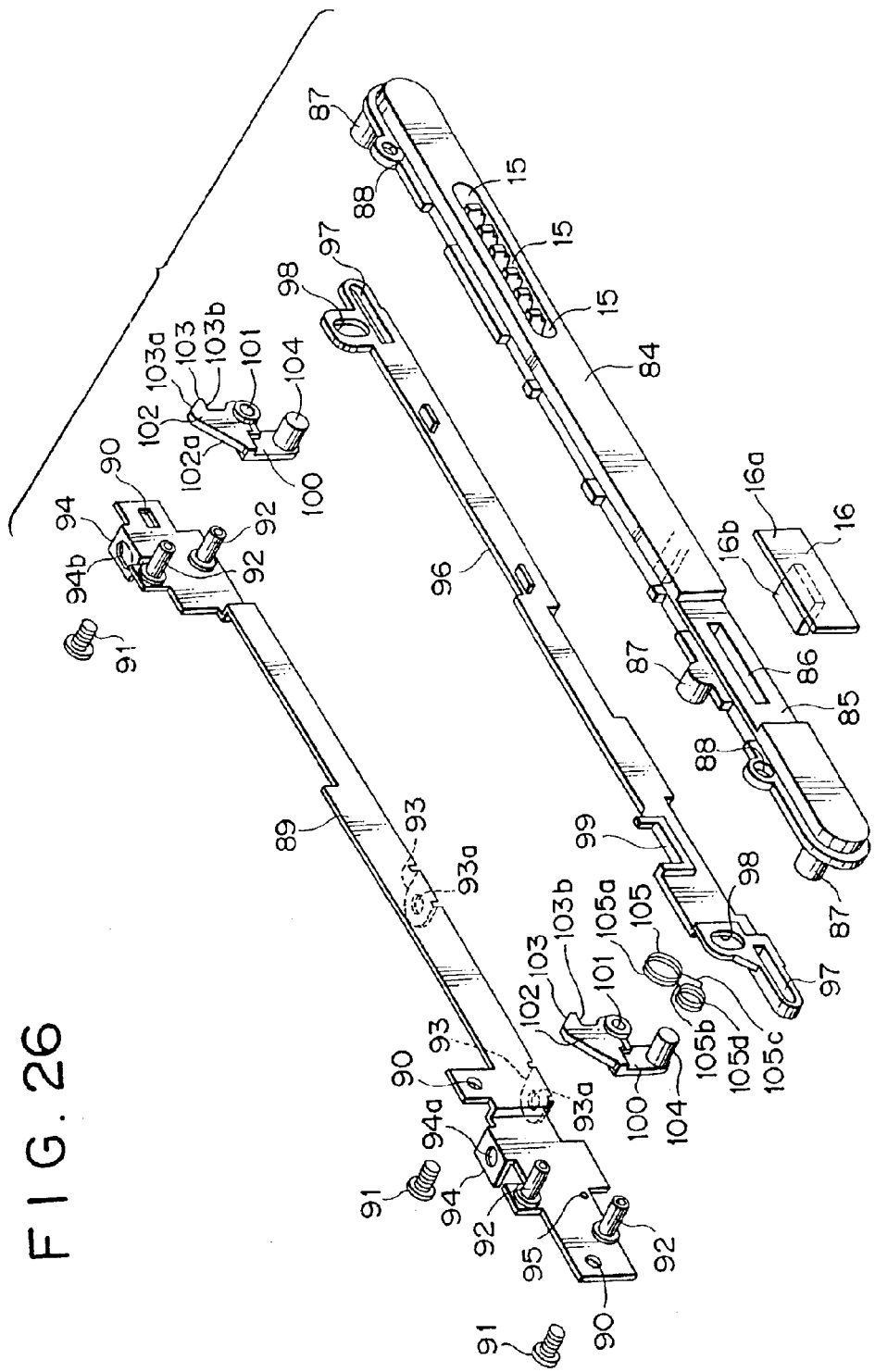
FIG. 26 is an exploded perspective view of the lock pawl unit of FIG. 25.

A plurality of pivot pins 92 are provided on the base plate 89 such that they project forwardly as seen in FIG. 26 such that, when the base plate 89 is secured to the front panel 84 as described above, front end portions of the pivot pins 92 are fitted into the positioning holes 88 formed on the front panel 84 to stabilize the positions of the pivot pins 92.

A pair of mounting lugs 93 and a pair of positioning lugs 94 are formed on the base plate 89 such that they project rearwardly. The mounting lugs 93 have screw insertion holes 93a formed therein, and a small circular positioning hole 94a is formed in the left side one of the positioning lugs 94 while a positioning hole 94b in the form of a leftwardly and rightwardly elongated hole is formed in the right side positioning lug 94 as seen in FIG. 26. Thus, the positioning holes 94a and 94b formed in the positioning lugs 94 of the base plate 89 are engaged with positioning pins provided on a frame chassis not shown of the computer body 2 to position the lock pawl unit 83 on the frame chassis, and in this state, screws not shown inserted in the screw insertion holes 93a of the mounting lugs 93 are screwed into the frame chassis to secure the lock pawl unit 83 to the frame chassis thereby to form the front wall 2b of the computer body 2.

A spring supporting hole 95 is formed at a lower portion rather near to the left end of the base plate 89 as seen in FIG. 26.

A pair of lock pawls and a link lever for interconnecting the lock pawls to move in an interlocking relationship are disposed between the front panel 84 and the base plate 89.

In particular, the link lever 96 is formed as a molded part of a synthetic resin and has a shape of a leftwardly and rightwardly elongated plate. A pair of leftwardly and rightwardly elongated slide holes 97 are formed at the opposite left and right end portions of the link lever 96 such that those of the pivot pins 92 which are positioned below the opposite left and right end portions of the link lever 96 are inserted in the slide holes 97 of the link lever 96 to support the link lever 96 for sliding movement in the leftward and rightward directions with respect to the front panel 84 and the base plate 89. The link lever 96 further has a pair of upwardly and downwardly elongated connection holes 98 formed at the opposite left and right end portions thereof. Furthermore, the link lever 96 has a connection recess 99 formed along an upper edge rather near to the left end thereof as seen in FIG. 26.

The left and right lock pawls 100 have the same shape as each other. It is to be noted that, in the description of the lock pawls 100, the upward and rightward directions and the leftward and rightward directions are defined as those when the lock pawls 100 projecting from the lock pawl insertion holes 10 are viewed from the front. Each of the lock pawls 100 is formed in a substantially upwardly and downwardly elongated shape and has a supported hole 101 formed at a substantially middle position in the upward and downward direction thereof. A left side edge 102a of a portion 102 of the lock pawl 100 higher than the supported hole 101 is formed as an inclined edge which is displaced upwardly rightwards, and a rightwardly projecting arresting pawl 103 is formed at the upper end of the portion 102. An upper edge 103a of the arresting pawl 103 is formed as an inclined edge inclined rightwardly downwards, and a lower edge 103b of the arresting pawl 103 is formed as an arresting portion extending in the leftward and rightward directions. A connection pin 104 is formed on a lower edge of the lock pawl 100 such that it projects forwardly as seen in FIG. 26.

The two upper side ones of the pivot pins 92 of the base plate 89 are inserted individually in the supported holes 101 to support the lock pawls 100 for pivotal motion with respect to the front panel 84 and the base plate 89, and the connection pins 104 are fitted for sliding movement in the connection holes 98 of the link lever 96 to connect the lock pawls 100 to the connection holes 98. Consequently, the lock pawls 100 operate in an interlocking relationship with each other through the link lever 96.

Figure 27:
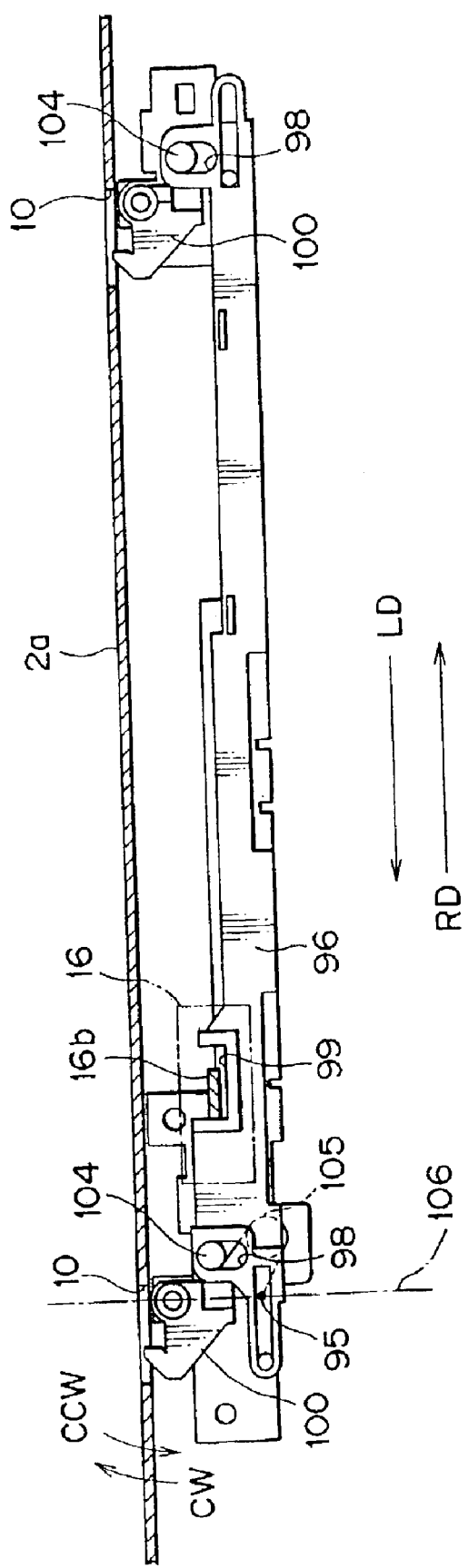
FIG. 27 is a front elevational view showing part of the lock pawl unit of FIG. 25 when a lock pawl is in a non-locking position.
Figure 28:
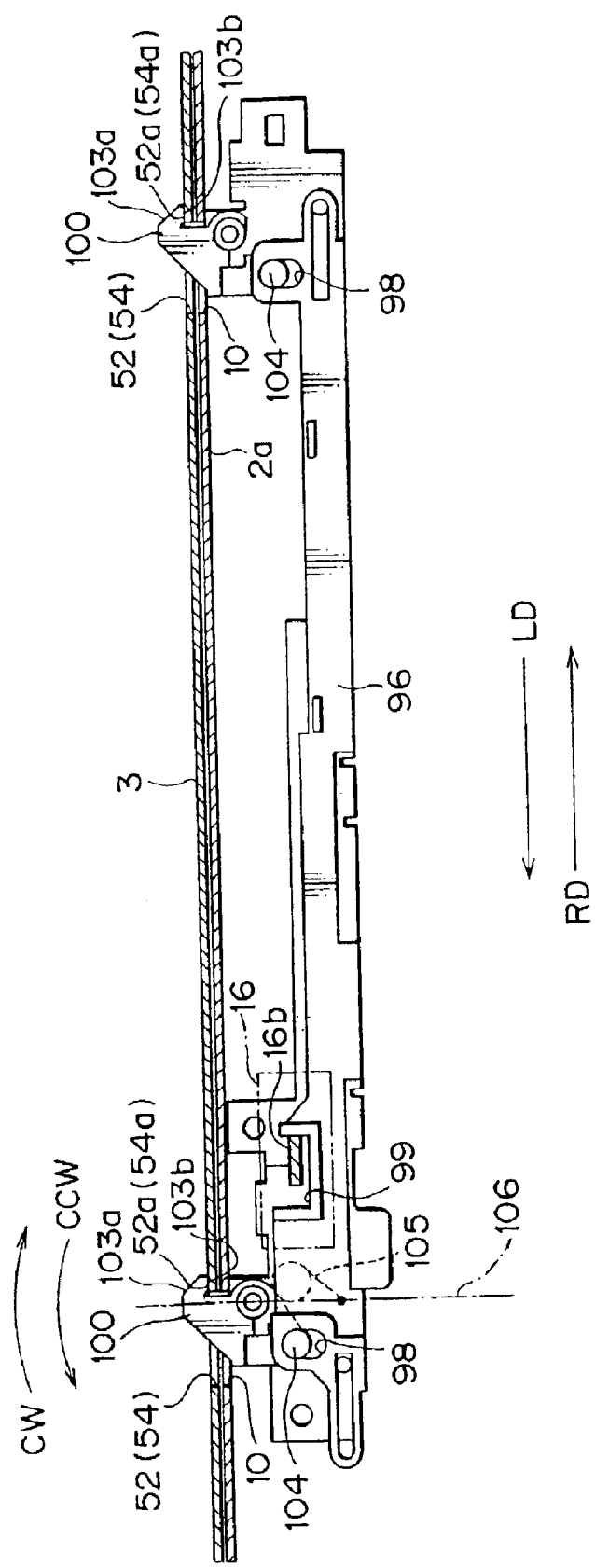
FIG. 28 is a similar view but showing part of the lock pawl unit of FIG. 25 when the lock pawl is in a locking position.

A toggle spring 105 is interposed between the base plate 89 and the left side one of the lock pawls 100. The toggle spring 105 has a pair of arms 105b and 105c extending from a central coiled portion 105a such that it generally has a V-shaped configuration, and a coiled portion 105d is formed at an end of one of the arms 105b as seen in FIG. 26. The coiled portion 105d of the arm 105b of the toggle spring 105 is fitted around the connection pin 104 of the lock pawl 100 while an end portion of the arm 105c is engaged with the spring supporting hole 95 of the base plate 89. The toggle spring 105 is interposed between the left side lock pawl 100 and the base plate 89 in this manner. The toggle spring 105 exerts such force as to move the ends of the two arms 105b and 105c away from each other so that, when the lock pawls 100 project upwardly through the lock pawl insertion holes 10 as seen in FIG. 28, the lock pawl 100 is biased in the clockwise direction as viewed from the front, that is, in the direction indicated by an arrow mark CW of FIG. 28. As a result, the link lever 96 is biased leftwardly through the connection pin 104 of the lock pawl 100, that is, in a direction indicated by an arrow mark LD in FIG. 28. Accordingly, the link lever 96 is held at the left end of its range of sliding movement, and consequently, the lock pawls 100 are held with certainty in the state wherein they project upwardly through the lock pawl insertion holes 10. On the other hand, in another state wherein the lock pawls 100 are retracted in the inside through the lock pawl insertion holes 10 as seen in FIG. 27, the left hand lock pawl 100 is biased in the counterclockwise direction as viewed from the front, that is, in the direction of an arrow mark CCW in FIG. 27. As a result, the link lever 96 is biased rightwardly through the connection pin 104 of the lock pawl 100, that is, in the direction indicated by an arrow mark RD in FIG. 27. Accordingly, the link lever 96 is held at the right end of its range of movement, and consequently, the lock pawls 100 are held with certainty in the state wherein they are retracted through the lock pawl insertion holes 10.

The slide element 16 described hereinabove is operatively associated with the link lever 96. The slide element 16 is formed as a molded part of a synthetic resin and has a main portion 16a and a connection lug 16b extending rearwardly from the main portion 16a as seen in FIG. 26. The connection lug 16b is fitted from the front side in the insertion hole 86 of the front panel 84, and the portion of the connection lug 16b which projects rearwardly from the front panel 84 is positioned within the connection recess 99 of the link lever 96. The main portion 16a of the slide element 16 is positioned for sliding movement in the leftward and rightward directions within the recess 85 of the front panel 84 in this manner.

Now, operation of the lock pawl unit 83 is described.

In FIG. 27, the lock pawls 100 are shown in their non-locking position. In this state, the link lever 96 is positioned at the right end of its range of movement and also the slide element 16 is positioned at the right end of its range of movement, and the left end of the connection lug 16b of the slide element 16 contacts with the left end of the connection recess 99 of the link lever 96. Thus, in order to pivot the lock pawls 100 to their locking position wherein the lock pawls 100 project upwardly through the lock pawl insertion holes 10 as seen in FIG. 28, the slide element 16 is moved leftwardly, that is, in the direction of an arrow mark LD in FIG. 27. Consequently, the left end of the connection lug 16b of the slide element 16 pushes the left end of the connection recess 99 of the link lever 96 to move the link lever 96 leftwardly. Upon the leftward movement of the link lever 96, the connection holes 98 of the link lever 96 push the lock pawl insertion holes 10 of the lock pawls 100 leftwardly. Consequently, the lock pawls 100 are pivoted in the clockwise direction as viewed from the front, that is, in the direction of an arrow mark CW in FIG. 27 until they come to the locking position illustrated in FIG. 28. It is to be noted that, when the left side lock pawl 100 is pivoted in the clockwise direction, the end of the arm 105b of the toggle spring 105 first approaches the end of the other arm 105c, and immediately after the end of the arm 105c, that is, the connection pin 104 of the lock pawl 100, goes leftwardly farther than a normal line 106 (a line normal to the direction of movement of the link lever 96) which passes the end of the arm 105c of the toggle spring 105, the force acting to move the two arms 105b and 105c of the toggle spring 105 away from each other now acts as a force to pivot the lock pawls 100 further in the clockwise direction and move the link lever 96 leftwardly. By the force, the link lever 96 is moved to the left end of its range of movement and the right end of the connection hole 98 is brought into contact with the right end of the connection lug 16b of the slide element 16, and thereupon, the lock pawls 100 are pivoted to their vertical position as seen in FIG. 28.

Then, if the lock pawls 100 are pivoted from the non-locking position to the locking position as described above while the display section 3 is in its covering position wherein it covers over the upper face 2a of the computer body 2 as seen in FIGS. 9 and 10, then the arresting portions 103b of the arresting pawls 103 of the lock pawls 100 are engaged with right side inner opening edges 52a or 54a of the engaging holes 52 or 54 formed in the display section 3 as seen in FIG. 28 thereby to lock the display section 3 in the covering position.

It is to be noted that, if the display section 3 is locked to its covering position otherwise at a central portion thereof in the leftward and rightward direction, then the opposite side portions of the display section 3 are liable to rise. However, with the information processing apparatus 1, since the display section 3 is locked at the opposite side portions thereof, such rising of the opposite side portions as mentioned above can be prevented with certainty, and therefore, such foreign articles as dust are less likely to be admitted between the upper face 2a of the computer body 2 and the display section 3.

Meanwhile, if it is designed otherwise such that the lock pawls are engaged with the engaging holes by sliding movement thereof in the leftward or rightward direction, then if some clearance is not provided between the arresting portions of the lock paws and faces with which the arresting portions are to contact, then the engagement itself is impossible. Therefore, some clearance must be provided between the arresting portions and the faces with which the arresting portions are to contact, and the clearance makes a cause of play of the display section in the covering position. In contrast, with the information processing apparatus 1, since the arresting pawls 103 are engaged with the engaging holes 52 or 54 by pivotal motion of the lock pawls 100, there is no necessity to provide some clearance between the arresting portions 103b of the arresting pawls 103 and the inner opening edges 52a or 54a of the engaging holes 52 or 54, and the inner opening edges 52a or 54a can be pulled in toward the computer body 2 side by the arresting portions 103b. Therefore, the display section 3 can be locked to the covering position in a play-free state.

In order to move the lock pawls 100 from the locking position illustrated in FIG. 28 to the non-locking position illustrated in FIG. 27, the slide element 16 is moved rightwardly, that is, in the direction indicated by an arrow mark RD in FIG. 28. When the slide element 16 is moved rightwardly, the right end of the connection lug 16b of the slide element 16 pushes the right end of the connection recess 99 of the link lever 96 rightwardly thereby to move the link lever 96 rightwardly. When the link lever 96 moves rightwardly, the connection holes 98 therein push the connection pins 104 of the lock pawls 100 rightwardly to pivot the lock pawls 100 in the counterclockwise direction as viewed from the front, that is, in the direction indicated by an arrow mark CCW in FIG. 28 until the lock pawls 100 reach the non-locking position as seen in FIG. 28. While the left lock pawl 100 is pivoted from the locking position illustrated in FIG. 28 to the non-locking position illustrated in FIG. 27, the end of the arm 105b of the toggle spring 105 is pushed so as to approach the end of the other arm 105c. Then, when the end of the arm 105b goes rightwardly farther than the normal line 106, then the biasing force of the toggle spring 105 now acts to move the link lever 96 rightwardly. Consequently, the link lever 96 is moved to the right end of its range of movement and the lock pawls 100 are pivoted to the non-locking position illustrated in FIG. 27. Further, the left end of the connection recess 99 of the link lever 96 is brought into contact with the left end of the connection lug 16b of the left side slide element 16 as seen in FIG. 27.

Where the display section 3 is locked to the covering position using the lock pawl unit 83 described above, it is necessary to provide only the engaging holes 52 and 54 in the display section 3, and miniaturization and reduction in weight of the display section 3 can be achieved. Besides, this advantage is significant particularly where the display section 3 has two such covering conditions including the condition illustrated in FIG. 9 and the condition illustrated in FIG. 10. Where two such covering conditions are used, if the lock pawls remain projecting from the front and rear faces of the display section 3, then they make an obstacle to various operations and deteriorate the convenience of use. Further, provision of such lock pawls which can be projected and retracted on the opposite front and rear faces of the display section 3 cannot avoid increase in size and weight of the display section.

Since the lock pawls 100 can be retracted in the inside through the lock pawl insertion holes 10 when they need not project as described above, they do not make an obstacle to operations of the information processing apparatus 1 by the user, for example, to operations of the operation keys 5.

Figure 29A:
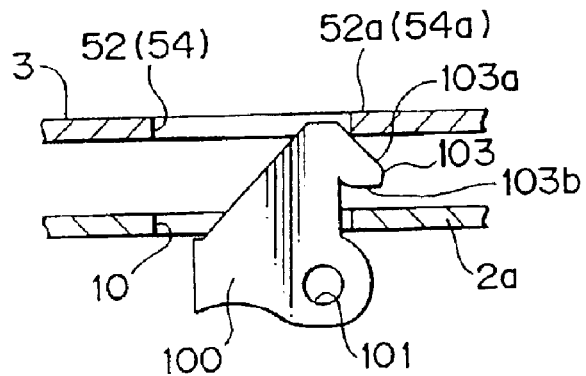
FIGS. 29A to 29C are sectional views illustrating a process when the lock pawl shown in FIG. 28 is moved from the locking position until the display section shown in FIG. 1 is locked to a covering position.
Figure 29B:
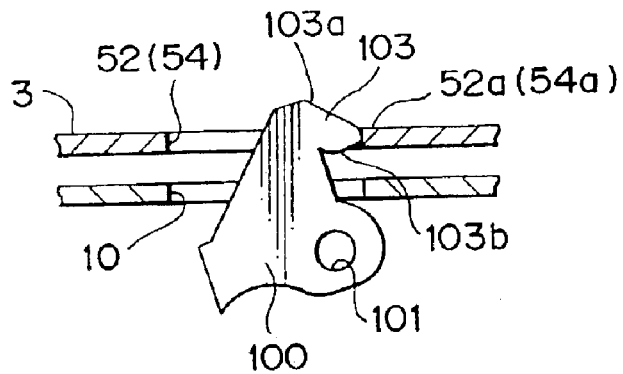
Figure 29C:
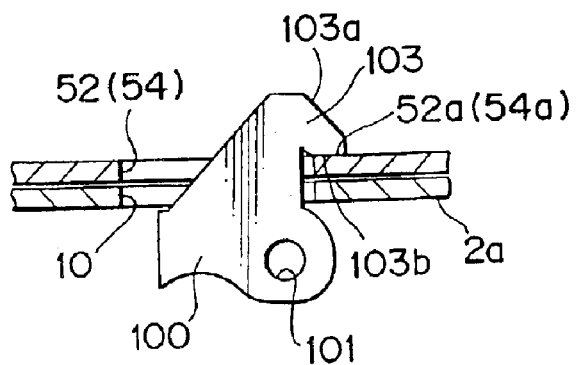
Figure 30:
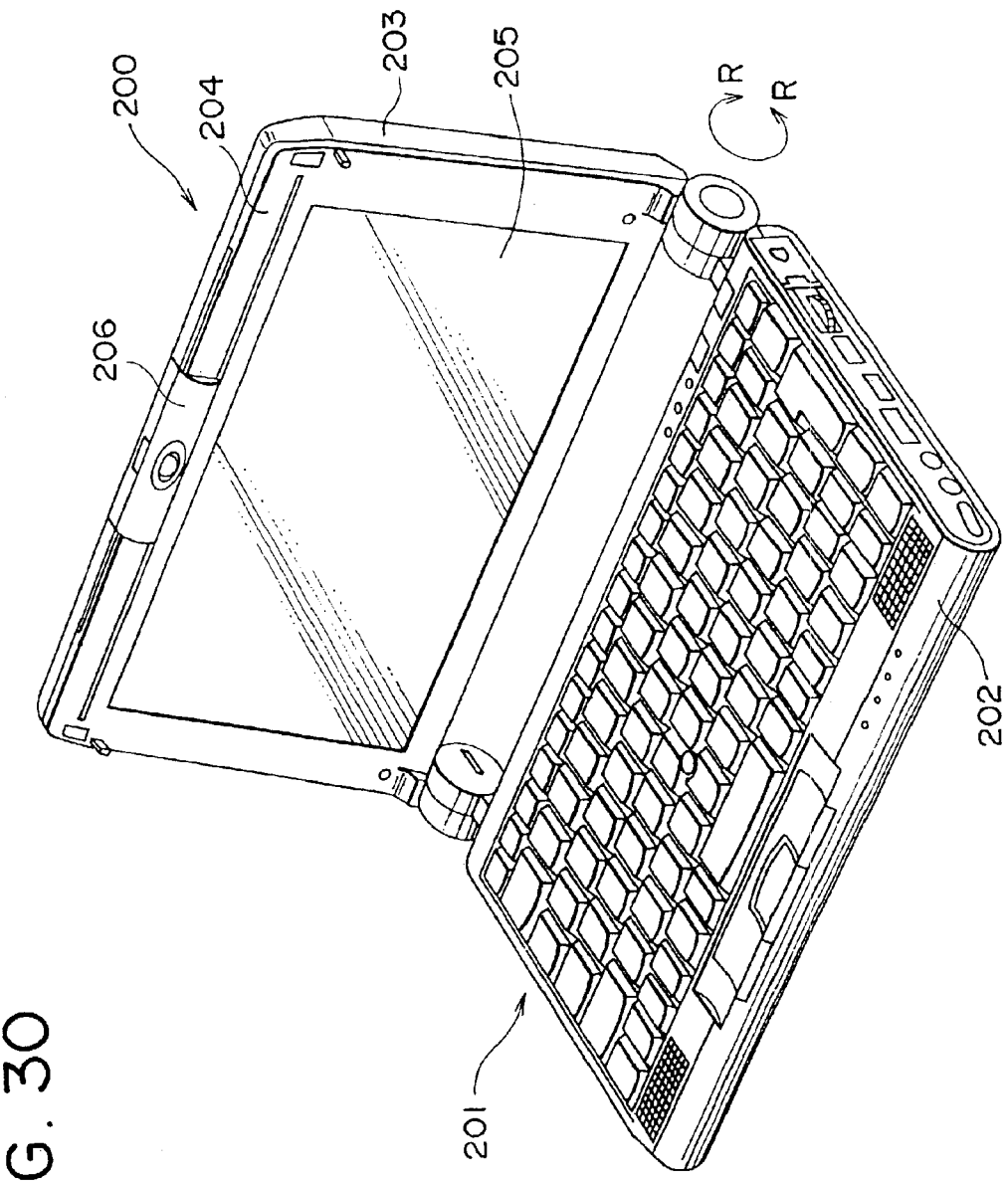
FIG. 30 is a perspective view showing an example of a conventional information processing apparatus.

In order to lock the display section 3 in such a covering position as seen in FIG. 9 or 10, the display section 3 is first moved into the covering position, and then the lock pawls 100 which are in the non-locking position are moved to the locking position. However, such locking of the display section 3 to the covering position can be performed also from another condition wherein the lock pawls 100 are positioned in the locking position illustrated in FIG. 28. In particular, while the lock pawls 100 are positioned in the locking position, the display section 3 is pivoted to the covering position illustrated in FIG. 9 or 10. Thereupon, the right edges of the engaging holes 52 or 54 of the display section 3 are first brought into contact with the upper edges 103a of the arresting pawls 103 and push the upper edges 103a as seen in FIG. 29A. Since the upper edges 103a of the arresting pawls 103 are pushed from above, the lock pawls 100 are acted upon by a pivoting force in the counterclockwise direction as viewed from the front, and the force acts to move the arm 105b of the toggle spring 105 toward the other arm 105c. Consequently, the lock pawls 100 are pivoted a little in the counterclockwise direction, that is, in the direction of an arrow mark CCW in FIG. 28 (whereupon also the link lever 96 is moved a little rightwardly, that is in the direction of an arrow mark RD in FIG. 28) thereby to allow the right edges of the engaging holes 52 or 54 to pass by the arresting pawls 103 downwardly as seen in FIG. 29B. After the engaging holes 52 or 54 of the display section 3 pass by the arresting pawls 103 downwardly, the link lever 96 is moved leftwardly by the resilient force of the toggle spring 105. Thereupon, the lock pawls 100 are pivoted in the clockwise direction until the arresting portions 103b of the arresting pawls 103 are engaged with the right side inner opening edges 52a or 54a of the engaging holes 52 or 54 of the display section 3 as seen in FIG. 29C.

In the following, different forms of use of the information processing apparatus 1 are described with reference to FIGS. 12 to 20. The information processing apparatus 1 can be used not only as a computer but also as a video camera as described hereinabove.

FIG. 12 shows a form of use of the information processing apparatus 1 wherein it is used as a computer. The display section 3 is pivoted in the direction of an arrow mark R1 illustrated in FIG. 12 from the covering position illustrated in FIG. 9, and the operation keys 5 of the keyboard 4 provided on the computer body 2 are uncovered. In this state, the user can operate the operation keys 5, stick type pointing device 6, left click button 7, right click button 8, center button 9, jog dial 50 and so forth to perform an inputting operation, an editing operation of inputted information and so forth.

Figure 13:
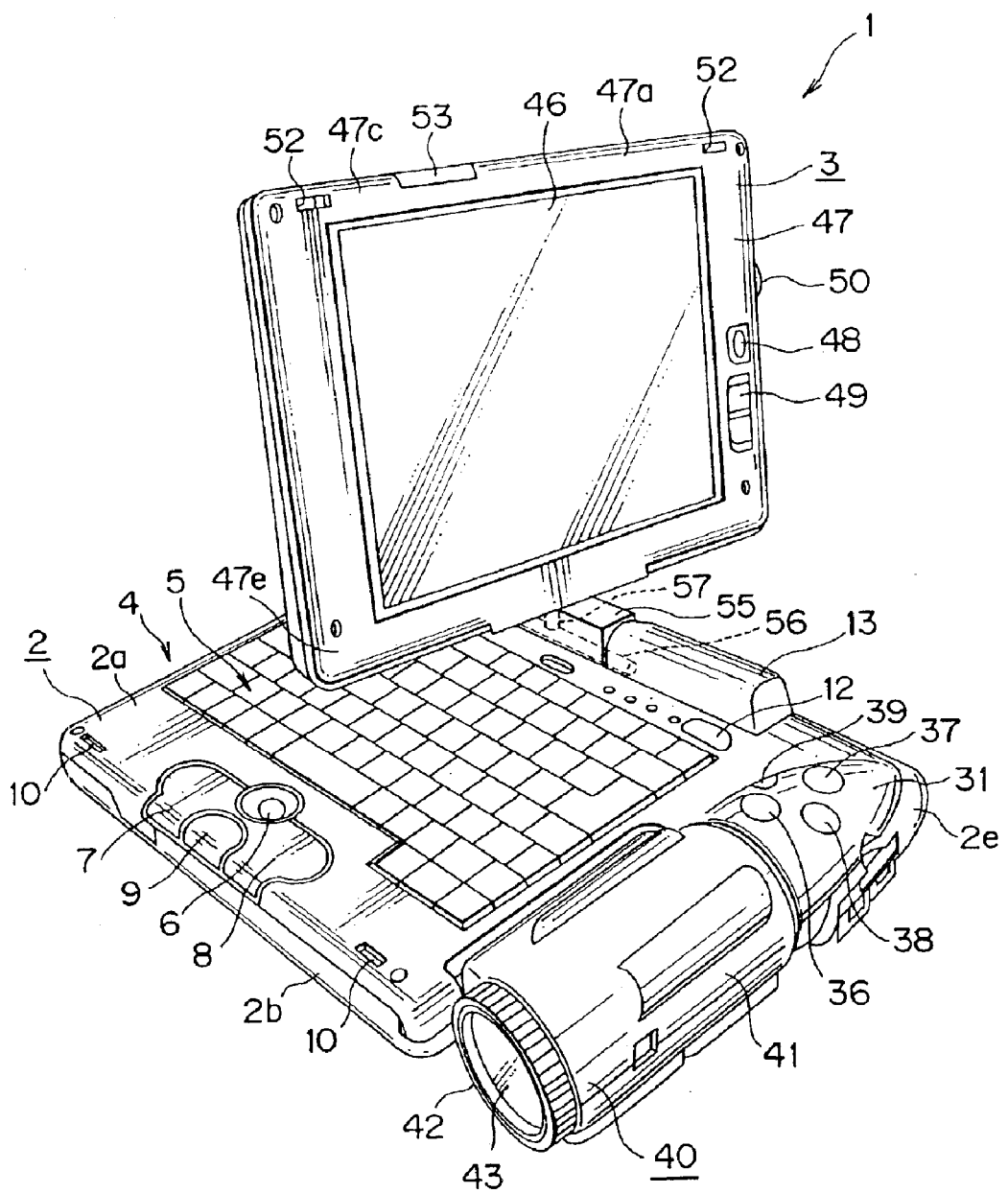
FIG. 13 is a perspective view showing the information processing apparatus of FIG. 1 when the display section is pivoted with respect to the computer body.
Figure 14:
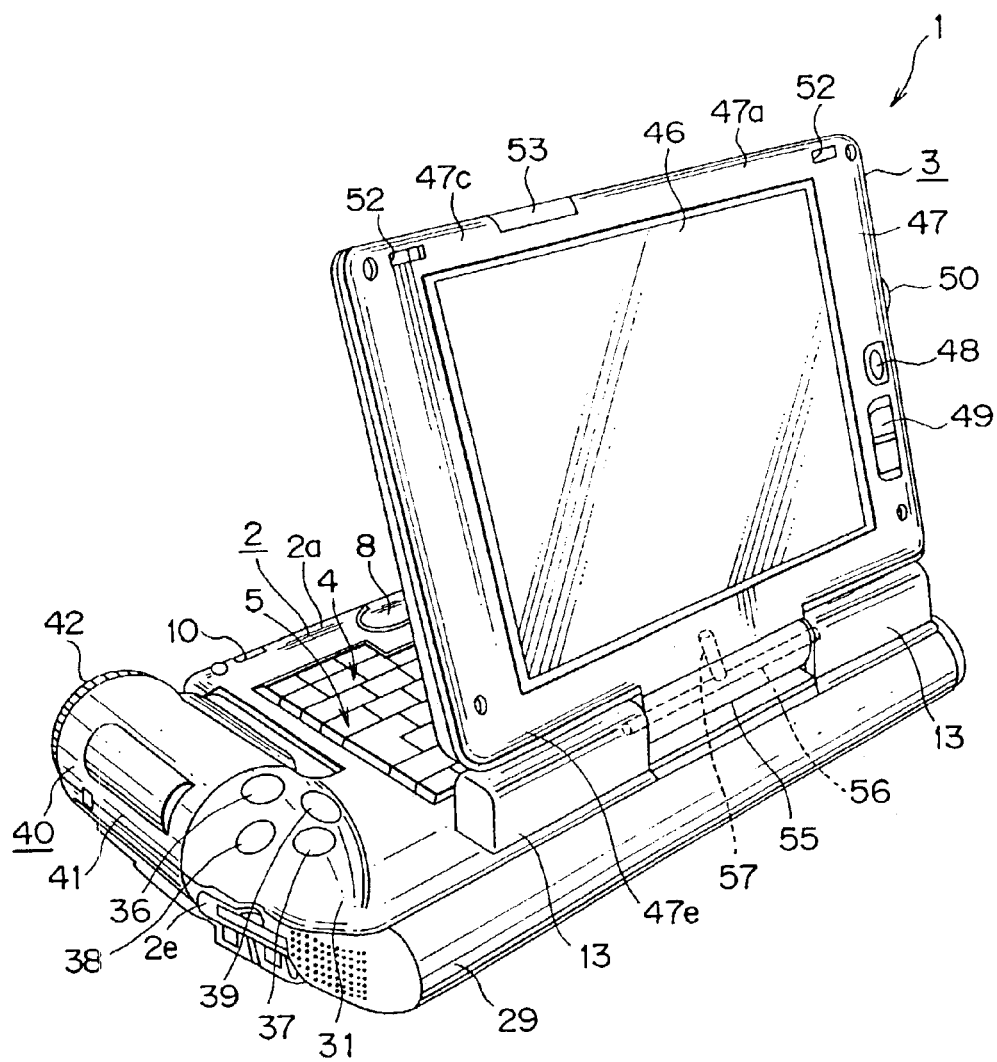
FIG. 14 is a perspective view showing the information processing apparatus of FIG. 1 when the display section is pivoted by 180° with respect to the computer body.

In order to use the information processing apparatus 1 as a video camera, the display section 3 is first pivoted from the position illustrated in FIG. 12 in the direction indicated by an arrow mark S1 or S2 in FIG. 12 around the second support shaft 57 as seen in FIG. 13. Then, the pivotal movement of the display section 3 is stopped when it is pivoted by 180° with respect to the computer body 2 as seen in FIG. 14. In this instance, the display screen 46 of the display section 3 is directed substantially rearwardly.

Figure 15:
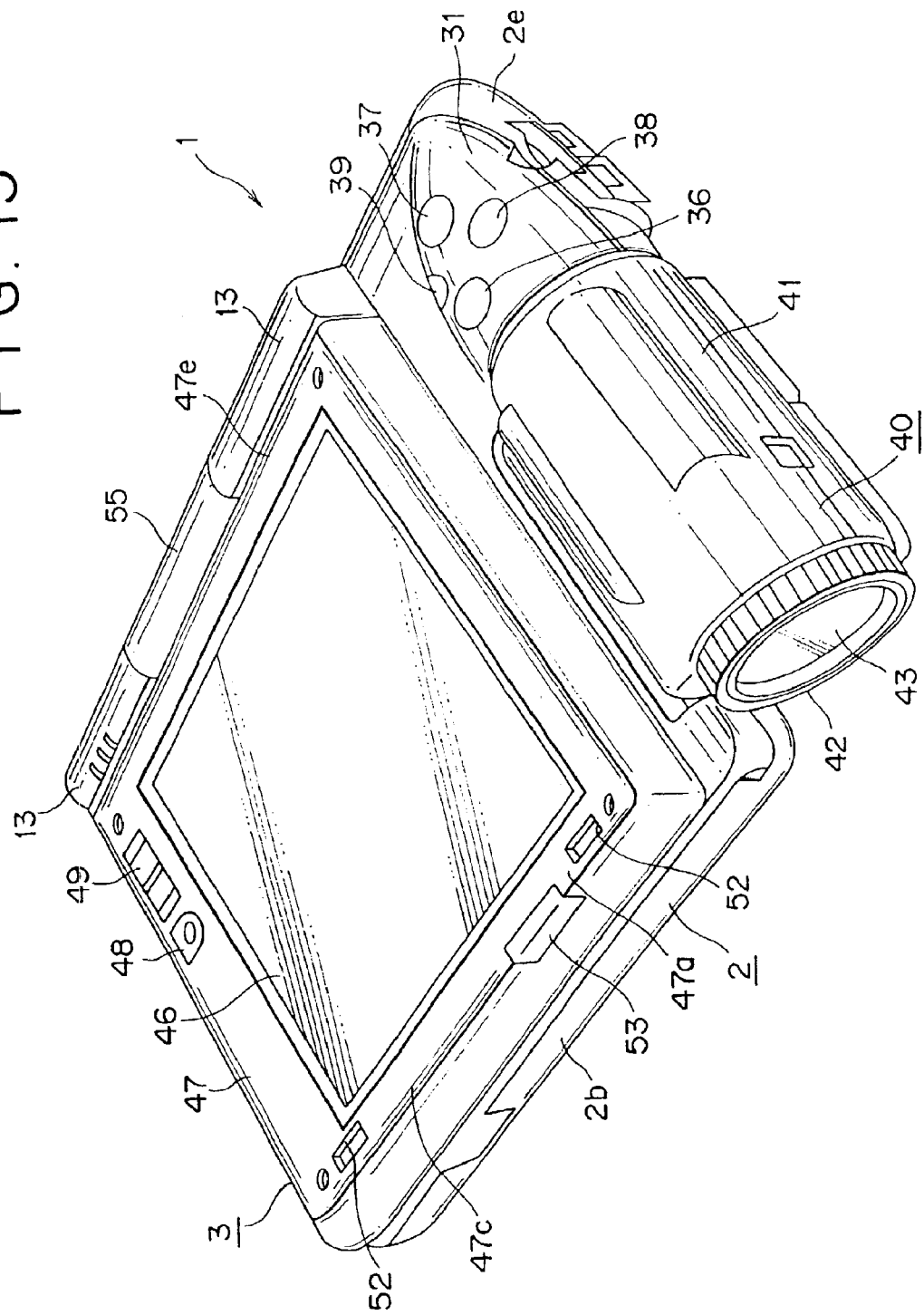
FIG. 15 is a perspective view showing the information processing apparatus of FIG. 1 when the display section is pivoted by 180° and pivoted to cover the keyboard.

Then, the display section 3 is pivoted around the first support shaft 56 until it covers over the operation keys 5 and so forth as seen in FIG. 15. In the state wherein the operation keys 5 and so forth are covered with the display section 3 in this manner, the slide element 16 provided on the front wall 2b of the computer body 2 is operated to slidably move leftwardly as described hereinabove. Thereupon, the lock pawls 100 are projected upwardly through the lock pawl insertion holes 10 and engaged with the engaging holes 54 to lock the display section 3 to its covering position as seen in FIG. 28. In this state, the display screen 46 is directed to the outer side.

Figure 16:
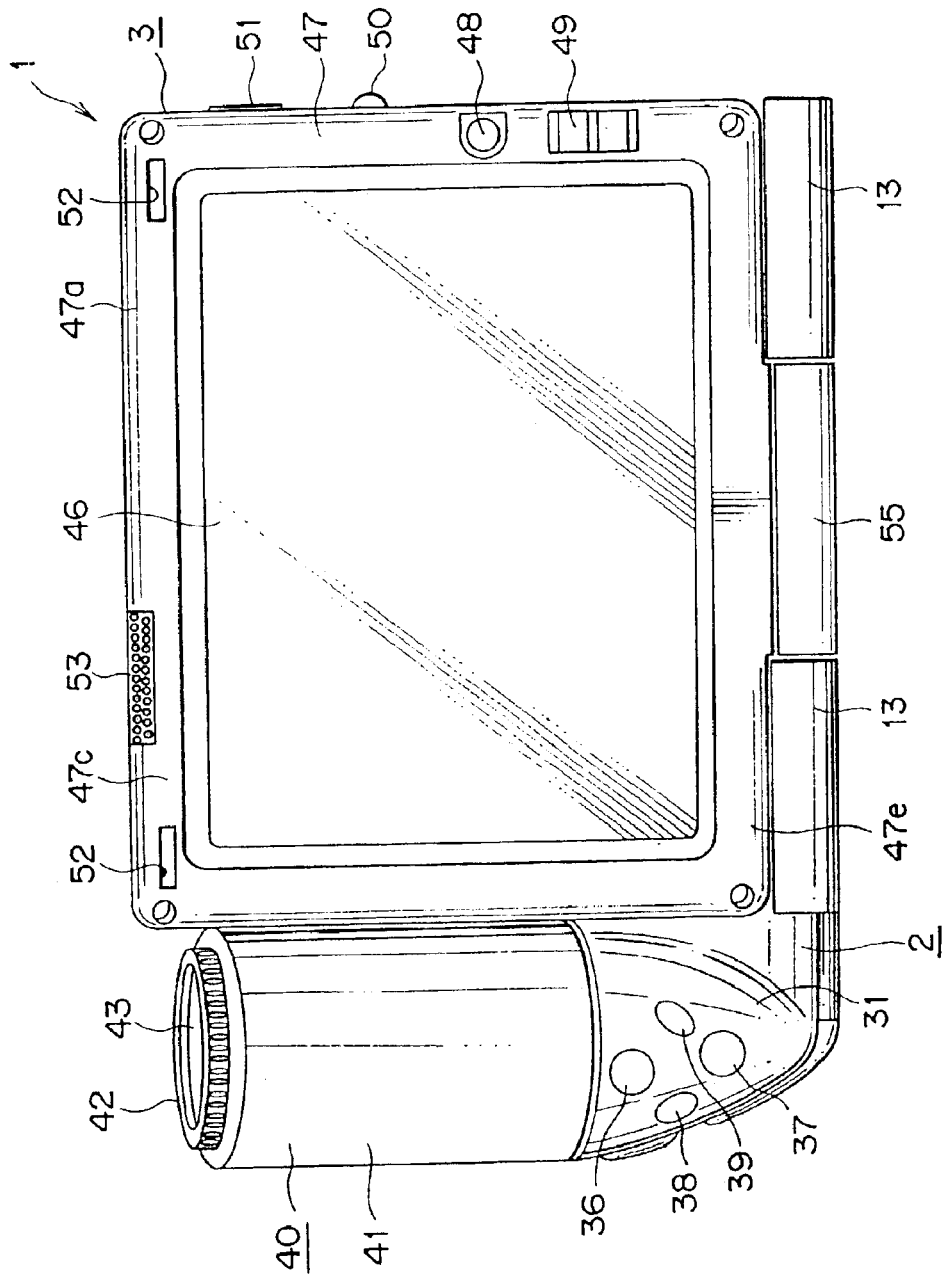
FIG. 16 is a front elevation view showing the information processing apparatus of FIG. 1 when it is used as a video camera before a camera section is turned.

The user will grasp the opposite side edges of the information processing apparatus 1 with its opposite hands such that the first end portion 47e of the frame portion 47 is positioned on the lower side while the second end portion 47c of the frame portion 47 is positioned on the upper side, and uses the information processing apparatus 1 as a video camera using the camera section 40 while observing the display screen 46 in front of the user itself as seen in FIG. 16.

In the information processing apparatus 1, the capture button 48 and the zoom knob 49 are provided on the frame portion 47 of the display section 3, and therefore, the image pickup person can operate the capture button 48 and the zoom knob 49 while grasping the information processing apparatus 1 with both hands thereof. Accordingly, the information processing apparatus 1 can be used as a video camera with improved convenience of use. Further, when the capture button 48 or the zoom knob 49 is used, since the information processing apparatus 1 is grasped with both hands, such a trouble that the information processing apparatus 1 drops inadvertently can be prevented.

In the information processing apparatus 1, since the jog dial 50 is provided on the frame portion 47, in both of a case wherein the information processing apparatus 1 is used as a computer and another case wherein the information processing apparatus 1 is used as a video camera as described above, when the display screen 46 is viewed from the front, the jog dial 50 is positioned normally at the same position (right side) as viewed from the user. Therefore, the operation direction of the jog dial 50 need not be changed in accordance with the form of use of the information processing apparatus 1, and consequently, good operability free from an unfamiliar feeling can be assured and good convenience in use can be anticipated.

Figure 17:
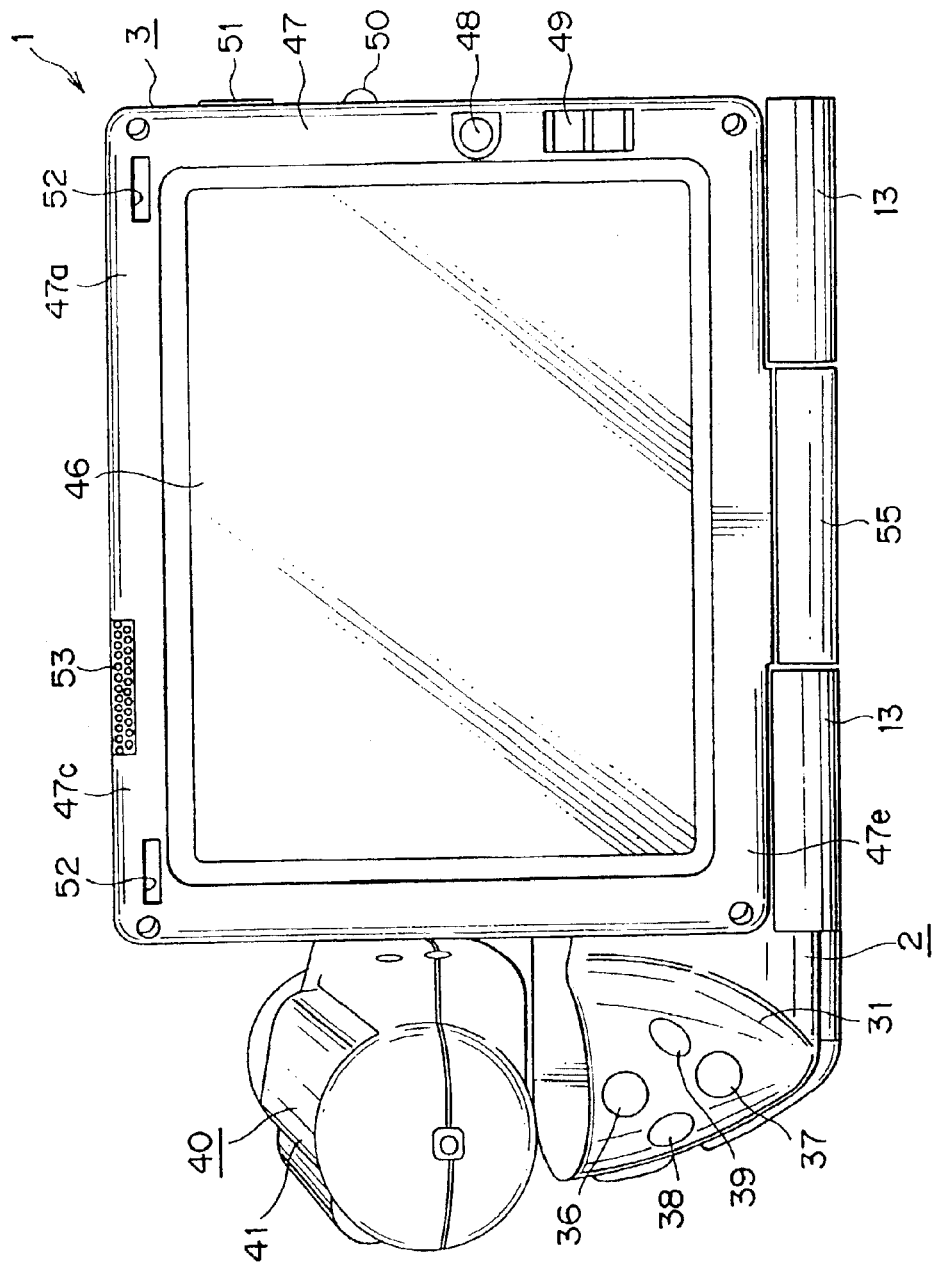
FIG. 17 is a front elevational view showing the information processing apparatus of FIG. 1 wherein the camera section is pivoted so that a front lens thereof is directed to the opposite side to the user.
Figure 18:
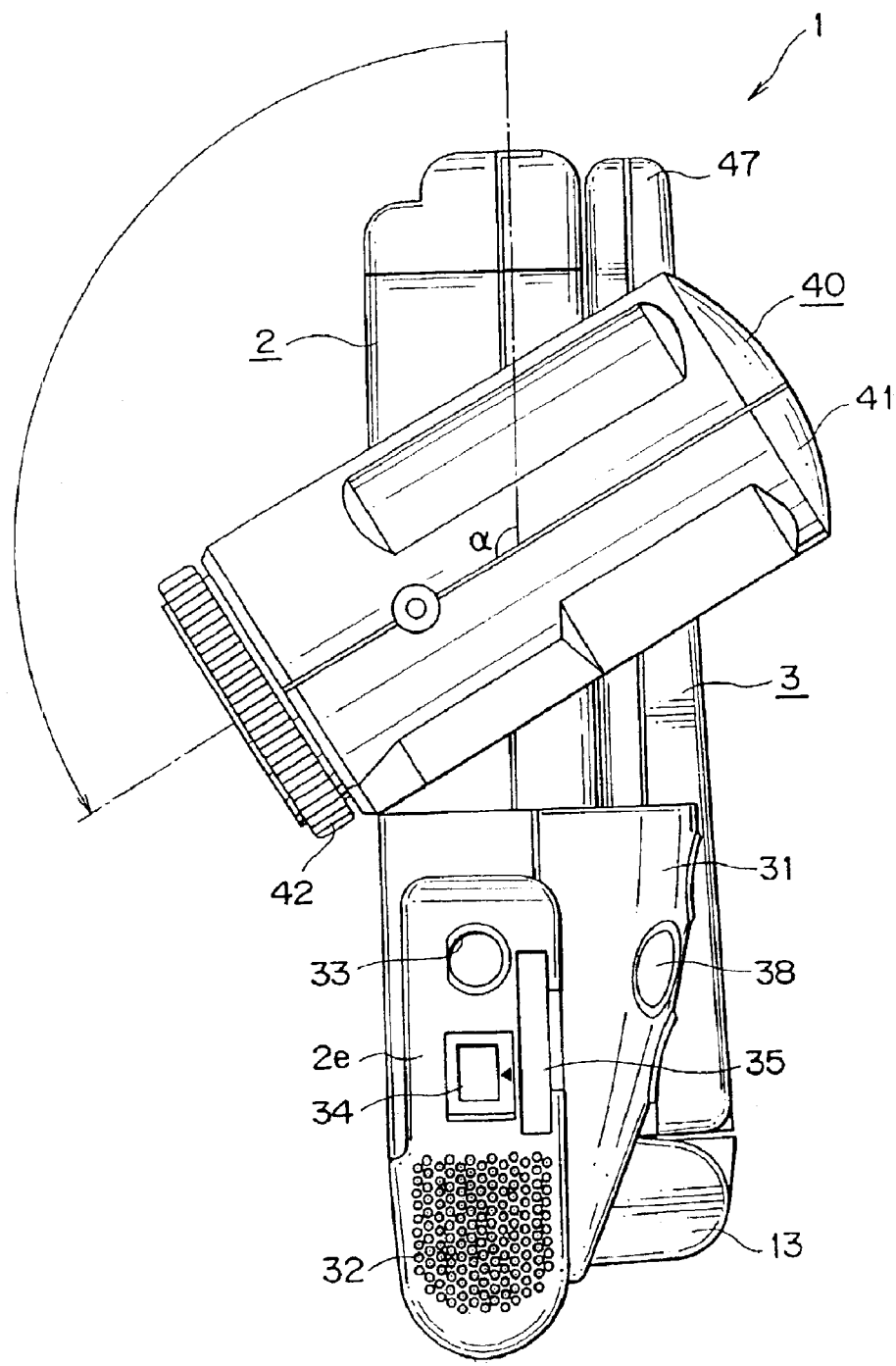
FIG. 18 is a side elevational view showing the information processing apparatus of FIG. 1 wherein the camera section is pivoted to a limit to the turning motion so that the front lens thereof is directed to the opposite side to the user.

When the user uses the camera section 40 to pick up an image, the user can pivot the camera section 40 so that the front lens 43 may be directed opposite to the image pickup person to pick up an image of an image pickup object present in an opposing relationship to the image pickup person as seen in FIG. 17. In this instance, the camera section 40 can be pivoted to a position in which an end portion thereof contacts with the button arrangement portion 31 of the computer body 2, and as seen in FIG. 18, the pivoting angle α is 120° in the maximum.

Figure 19:
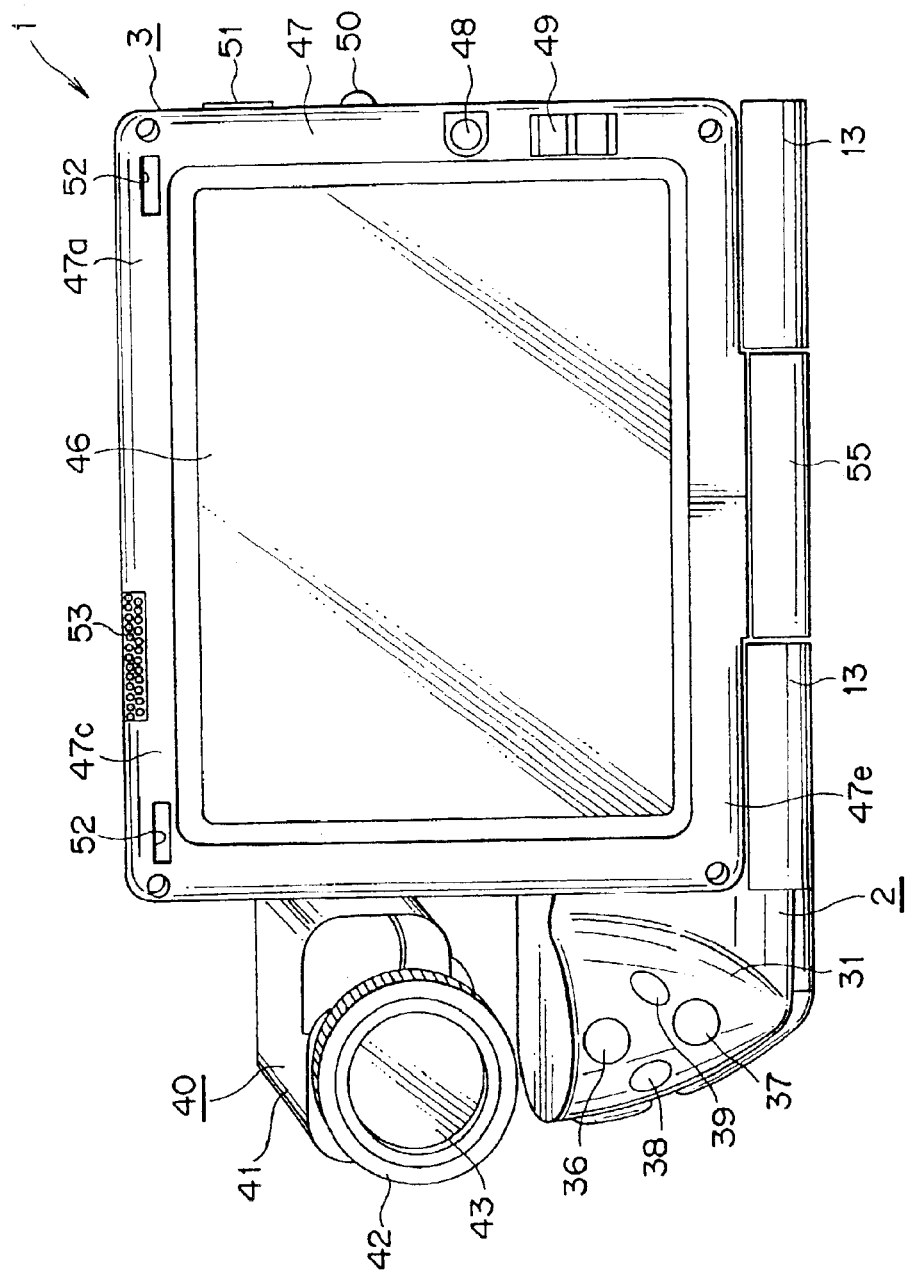
FIG. 19 is a front elevational view showing the information processing apparatus of FIG. 1 wherein the camera section is pivoted so that the front lens thereof is directed to the user.
Figure 20:
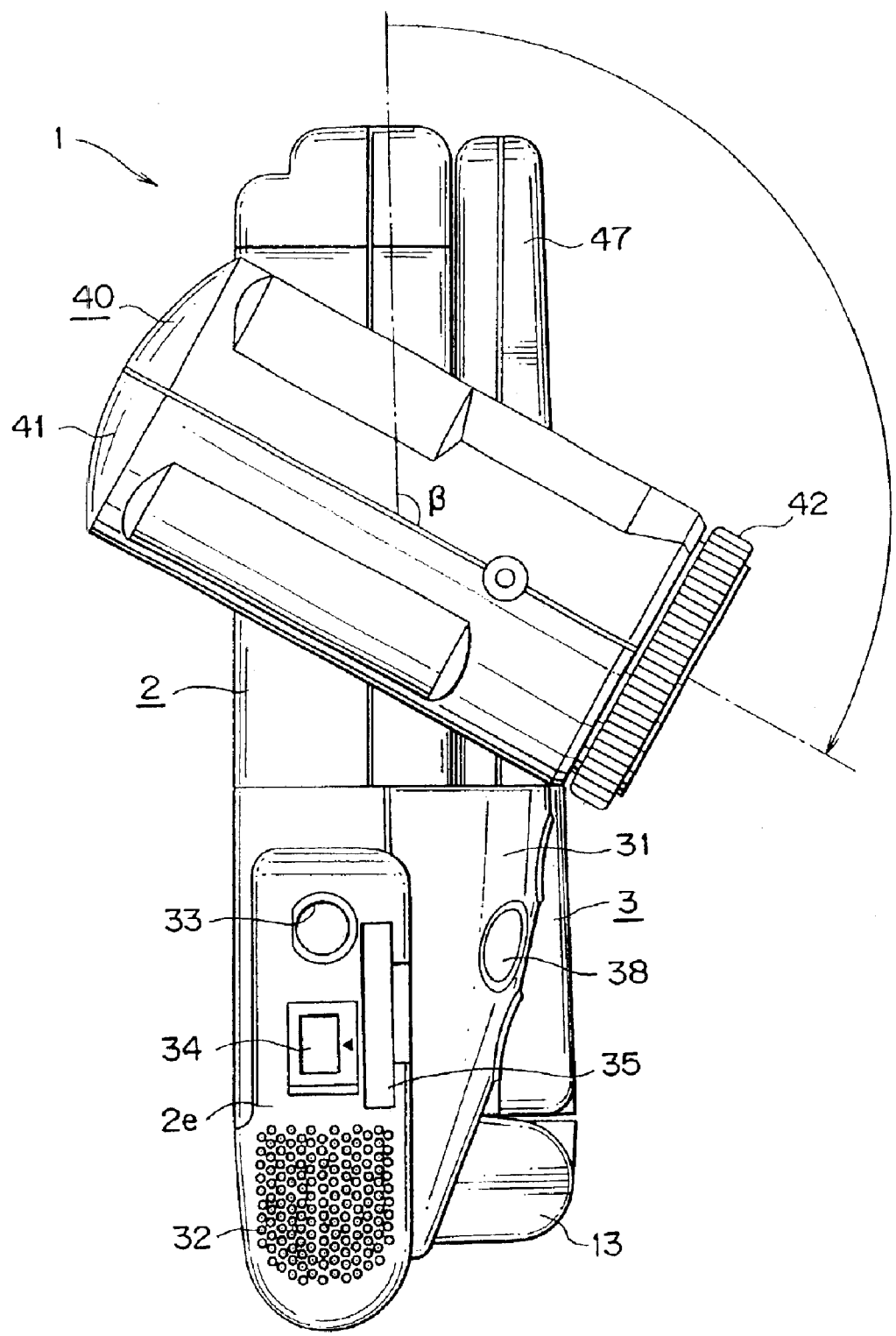
FIG. 20 is a side elevational view showing the information processing apparatus of FIG. 1 wherein the camera section is pivoted to a limit to the turning motion so that the front lens thereof is directed to the user.

Further, when the user uses the camera section 40 to pick up an image, the user can pivot the camera section 40 so that the front lens 43 may be directed to the image pickup person to pick up an image of, for example, the image pickup person itself as seen in FIG. 19. In this instance, the camera section 40 can be pivoted to a position in which an end portion thereof contacts with the button arrangement portion 31 of the computer body 2, and as seen in FIG. 20, the pivoting angle α is 120° in the maximum. Accordingly, in the information processing apparatus 1, the camera section 40 can be pivoted over an angular range of 240° as seen from FIGS. 18 and 20.

It is to be noted that, when the camera section 40 is pivoted so that the front lens 43 is directed to the image pickup person side as seen in FIGS. 19 and 20, the direction of the pivotal motion of the camera section 40 is detected by the reversal switch 81 built in the camera section 40, and the image to be displayed on the display screen 46 is reversed so that an image correctly oriented in the vertical direction is displayed.

When the user tries to pivot the camera section 40 as seen in FIGS. 17 to 20, the user can pivot the camera section 40 while grasping the opposite side edge portions of the information processing apparatus 1 with both hands thereof. Consequently, such a trouble that the information processing apparatus 1 drops inadvertently can be prevented.

Further, in the information processing apparatus 1, since the heat radiation hole 15 is provided in the front wall 2b of the computer body 2 as described hereinabove, the heat radiation hole 15 is not closed up with both hands of the user with which the information processing apparatus 1 is grasped upon image pickup, and consequently, efficient heat radiation can be anticipated.

When the information processing apparatus 1 is used as a video camera using the camera section 40, it can be used not only in such forms of use as described hereinabove with reference to FIGS. 16 to 20, but also in such forms as, for example, illustrated in FIGS. 12 to 15. Also when the information processing apparatus 1 is used as a computer, it can be used not only in such a form of use as described hereinabove with reference to FIG. 12, but also in such forms of use as, for example, illustrated in FIGS. 13 to 20. However, where the convenience in use is taken into consideration, the form of use of the information processing apparatus 1 most suitable for use as a computer is the form of use illustrated in FIG. 12, and the form of use of the information processing apparatus 1 most suitable for use as a video camera is the forms of illustrated in FIGS. 16 to 20.

As described above, in the information processing apparatus 1, the display section 3 is supported for opening and closing movement and also for pivotal motion on the computer body 2 and the camera section 40 is supported for pivotal motion on the computer body 2. Accordingly, the camera section 40 can be used to pick up an image while the keyboard 4 is covered with the display section 3 as described hereinabove with reference to FIGS. 16 to 20, and the image pickup person is prevented from operating the operation keys 5 and so forth of the keyboard 4 in error and consequently an otherwise possible malfunction can be prevented.

Further, since the camera section 40 is provided on the computer body 2, a camera section having a large size, high picture quality and higher functions can be used as the camera section 40.

In the following, functions and examples of operation of the application button 36, menu button 37, A button 38 and B button 39 provided on the button arrangement portion 31 when the camera section 40 is used to pick up an image are described with reference to FIGS. 21 to 24.

The application button 36 has a function same as the application key 5c which is one of the operation keys 5 of the keyboard 4 and particularly has a function for displaying menus corresponding to application software which is currently operating. The menu button 37 has a function for displaying menus without relying upon operating application software and allows, for example, startup of the application software for a camera, ending of operating application software, and switching on/off of the power supply. The A button 38 and the B button 39 are used to execute functions unique to operating application software.

Figure 22:
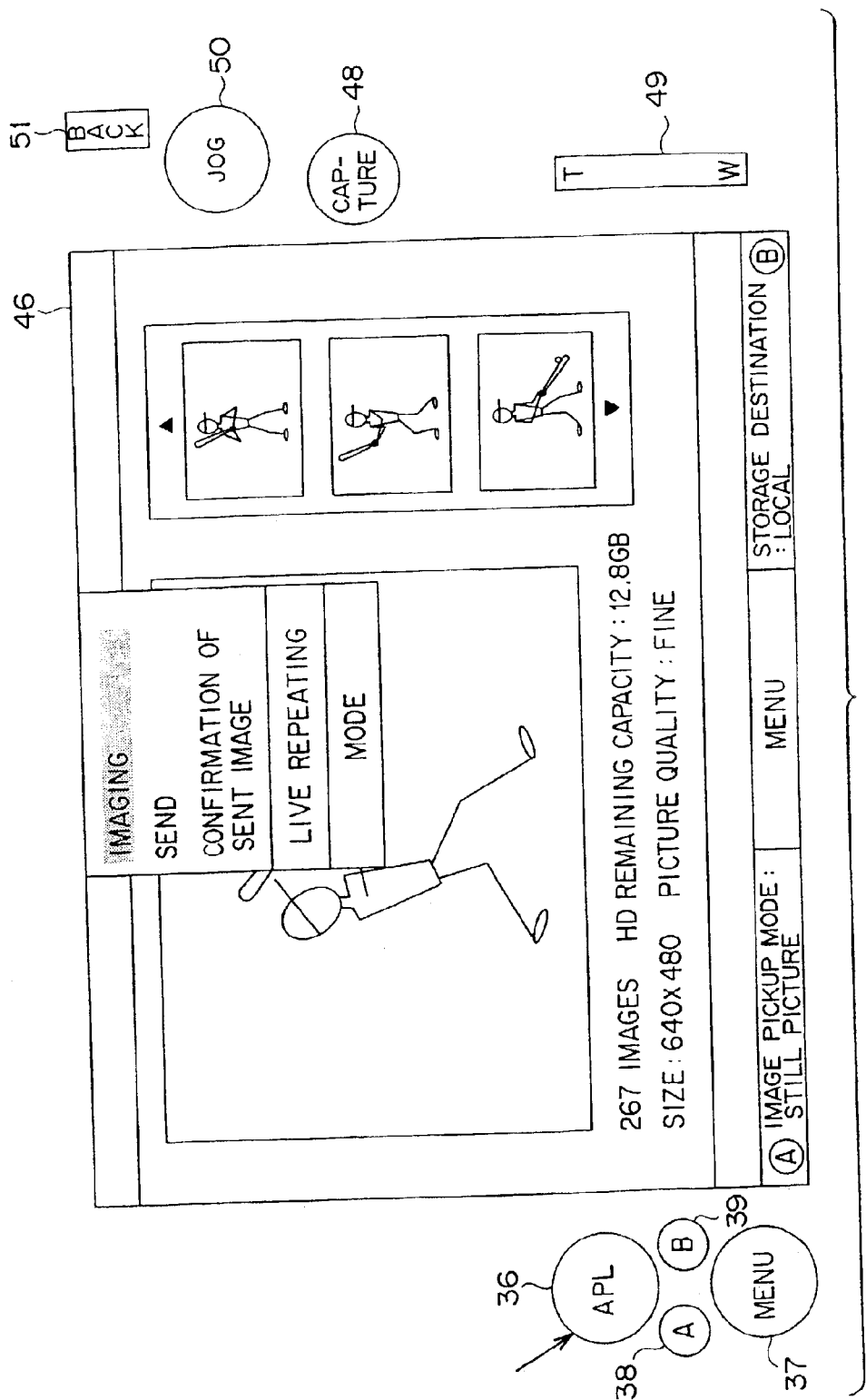
FIG. 22 is a front elevational view of the display screen when an application button is operated.
Figure 23:
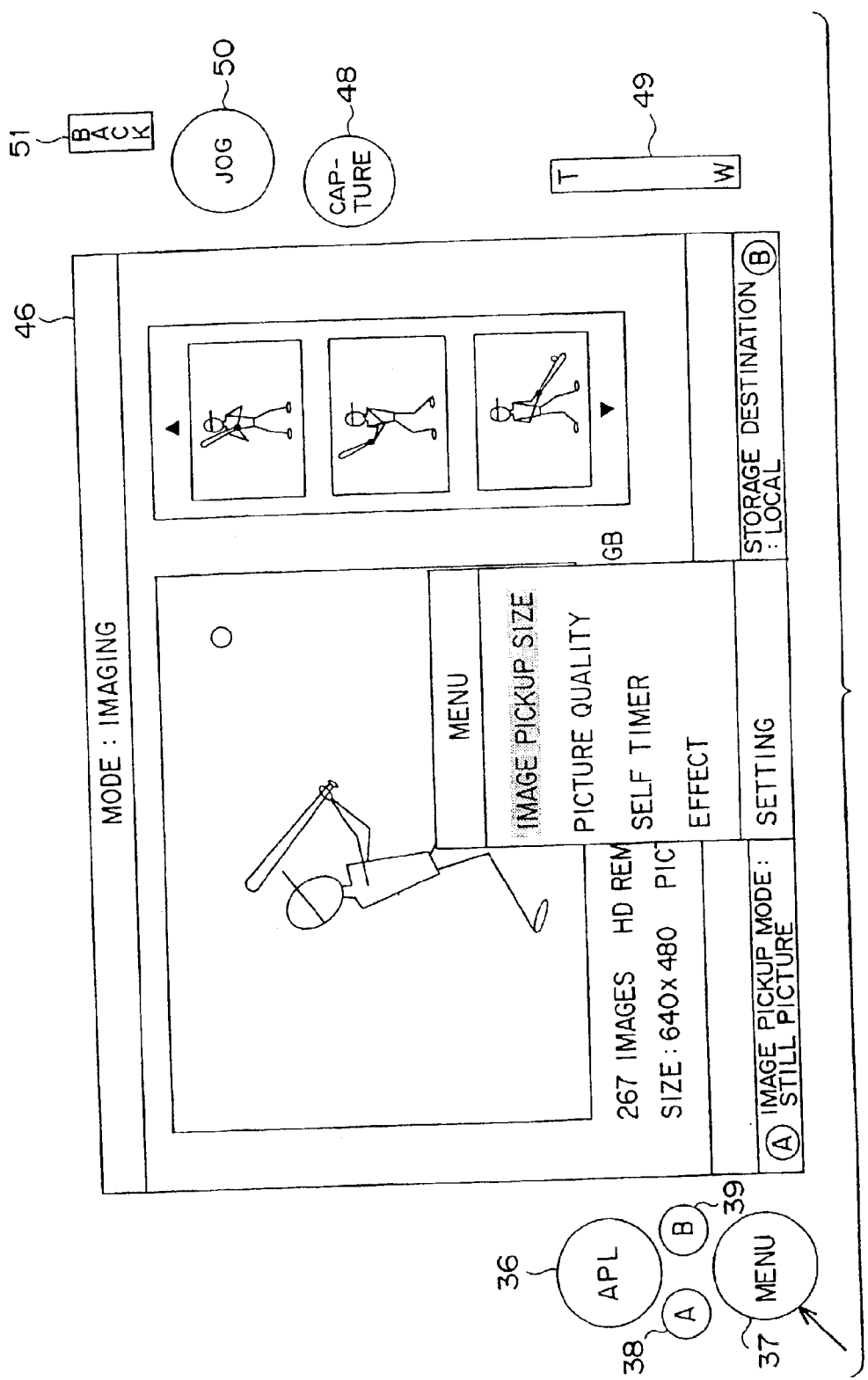
FIG. 23 is a front elevational view of the display screen when a menu button is operated.
Figure 24:
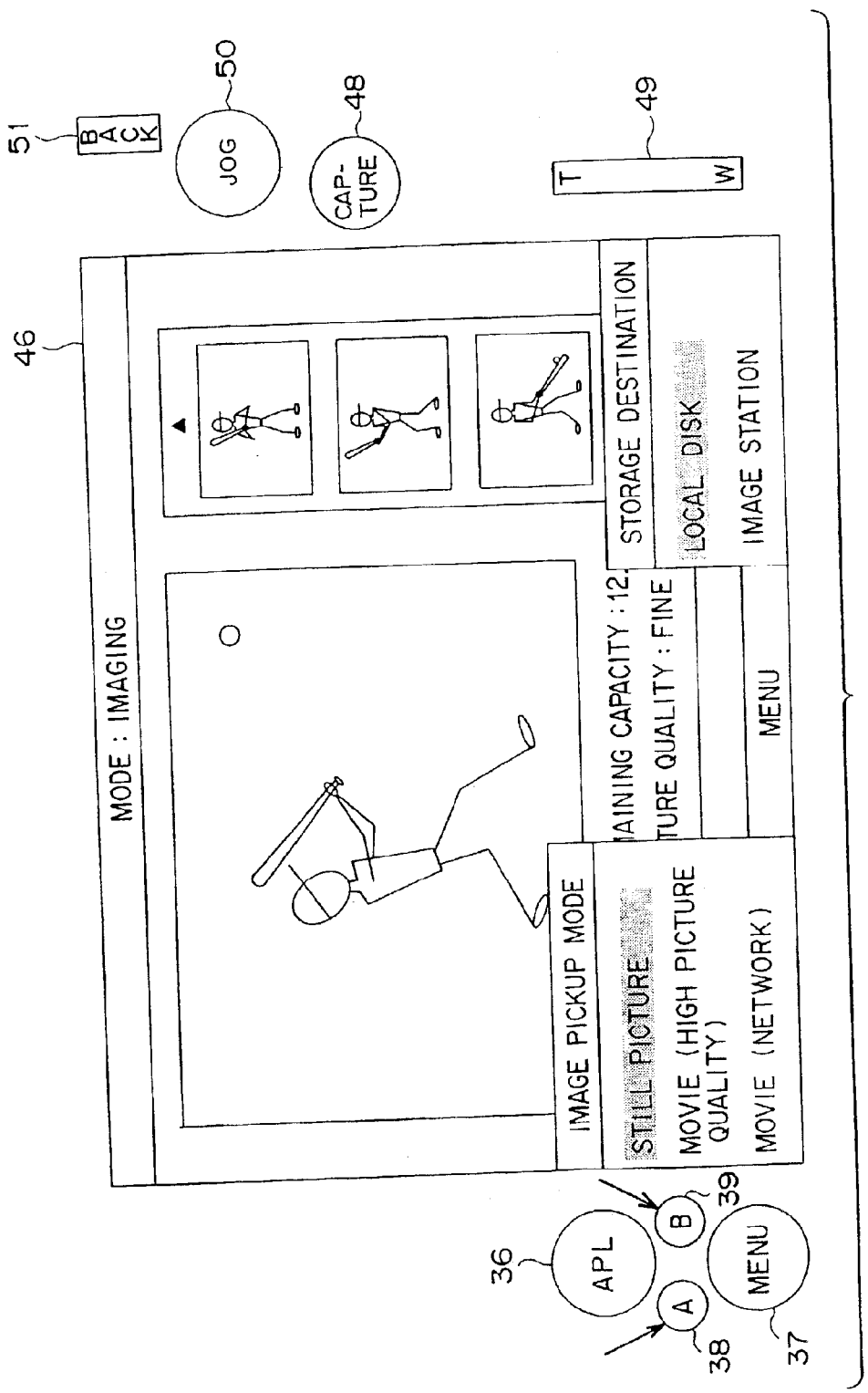
FIG. 24 is a front elevational view of the display screen when an A button or a B button is operated.
Figure 25:
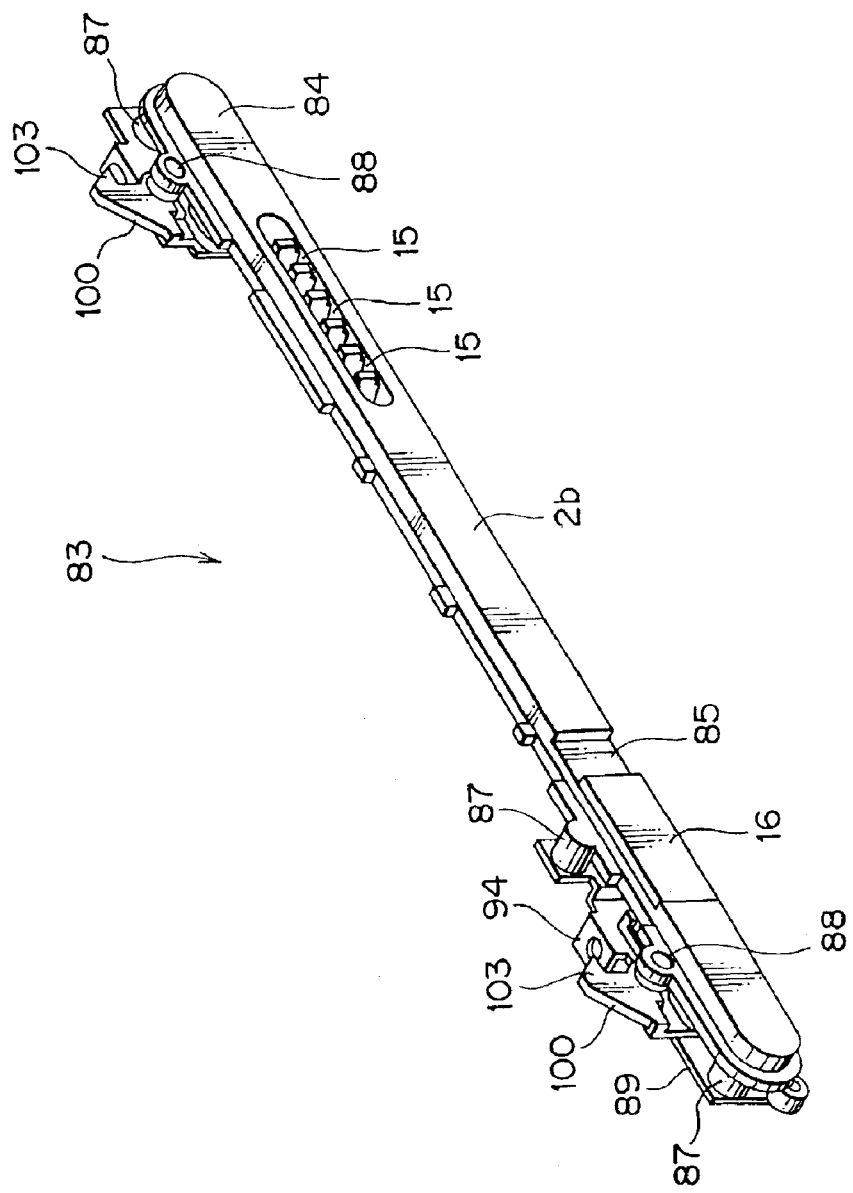
FIG. 25 is a perspective view showing a lock pawl unit of the information processing apparatus of FIG. 1.

If the application button 36, menu button 37, A button 38 or B button 39 is operated, then menus corresponding to the arrangement of the button 36, 37, 38 or 39 are displayed as described below. In particular, if the application button 36 is operated, then menus are displayed at an upper middle portion of the display screen 46 as seen in FIG. 22. If the menu button 37 is operated, then menus are displayed at a lower middle portion of the display screen 46 as seen in FIG. 23. If the A button 38 is operated, then menus are displayed at a lower left portion of the display screen 46 as seen in FIG. 24. If the B button 39 is operated, then menus are displayed at a lower right portion of the display screen 46 as seen in FIG. 24.

Figure 21:
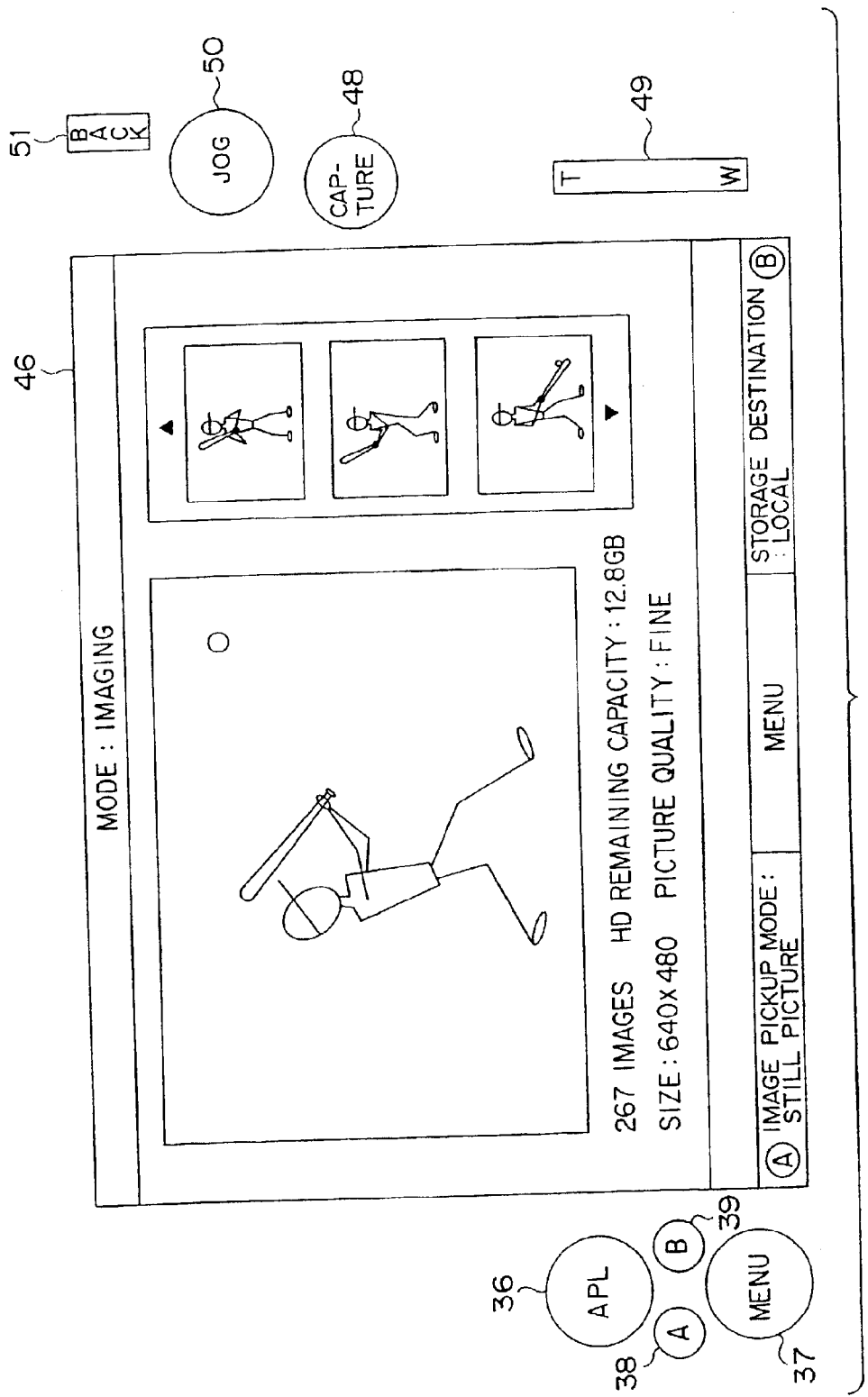
FIG. 21 is a front elevational view of the display screen on which a picked up image is displayed.

FIG. 21 shows an example of an image displayed on the display screen 46 in an "Imaging" mode, that is, an image pickup mode (still picture). On the display screen 46, three images fetched already by operation of the capture button 48 are displayed in a vertically elongated display region (hereinafter referred to as thumbnail region). Such three images can be scrolled by an operation of the jog dial 50, and the images to be displayed in the thumbnail region are successively fed by such operation of the jog dial 50. Further, in another region of the display screen 46 extending from a central portion to the left side, an image to be picked up by the camera section 40 is displayed. It is to be noted that, on the display screen 46, the number of picked up images, the remaining storage capacity of the hard disk, the picture size and the picture quality are displayed.

FIG. 22 shows the display screen 46 when the application button 36 is operated. In particular, a menu window screen is displayed at an upper central portion of the display screen 46. The cursor is currently positioned on the "Imaging" menu. The menu designated by the cursor is scrolled by a rotating operation of the jog dial 50, and the menu is determined by a pressing operation of the jog dial 50.

FIG. 23 shows the display screen 46 when the menu button 37 is operated. In particular, a menu window screen is displayed at a lower central portion of the display screen 46. The cursor is currently positioned on the "Pickup size" menu. Also the menu designated by the cursor in this instance is scrolled by a rotating operation of the jog dial 50, and the menu is determined by a pressing operation of the jog dial 50, similarly as upon operation of the application button 36.

FIG. 24 shows the display screen 46 when the A button 38 is operated and when the B button 39 is operated. In particular, a menu window screen by the A button 38 is displayed at a lower left corner of the display screen 46, and a menu window screen by the B button 39 is displayed at a lower right corner of the display screen 46. It can be seen that, at present, on the menu window screen on the left side, the cursor is present on the "Still picture" menu, and on the menu window screen on the right side, the cursor is present on the "Local disk" menu.

As seen from the left side menu window screen, for moving pictures, a "high picture quality" for a high compression rate and a "network (low picture quality)" for a low compression rate are provided as choices. For example, when data are to be stored into a server or in a like case, the "network" may be suitably selected.

The "Local disk" displayed on the right side menu window screen is selected in order to store data onto the hard disk of the built-in HDD 72. On the other hand, the "Image station" is selected in order to store data into a server on a network. More particularly, the "Image station" is selected, for example, in order to establish a connection to the Internet from a portable telephone set connected to the computer body 2 and successively send data on the real time basis to a server on the Internet.

While a preferred embodiment of the present invention has been described using specific terms, such description is for illustrative purposes only, and it is to be understood that changes and variations may be made without departing from the spirit or scope of the following claims.

What is claimed is:

1. An information processing apparatus, comprising:
   a computer body having a keyboard on which a plurality of operation keys are provided;
   a display section having a display screen thereon and supported on said computer body for pivotal motion around a first axis between a covering position in which said display section covers said computer body and an uncovering position in which said display section does not cover said computer body and for pivotal motion around a second axis extending perpendicularly to said first axis, said display section further having a frame portion for holding said display screen;

a camera section provided on one of the opposite side edge portions of said computer body;

a jog dial for being rotated by a rotating operation and being laterally moved bodily by a pressing operation; and controller means for reversing an image displayed on said display screen when said camera section is pivoted in a predetermined direction with respect to said computer body.

* * * * *